US012568359B2

(12) United States Patent
Pan et al.

(10) Patent No.: US 12,568,359 B2
(45) Date of Patent: Mar. 3, 2026

(54) DATA TRANSMISSION METHOD AND APPARATUS

(71) Applicant: Shenzhen Yinwang Intelligent Technologies Co., Ltd., Shenzhen (CN)

(72) Inventors: Kai Pan, Shanghai (CN); Jing Chen, Shanghai (CN)

(73) Assignee: Shenzhen Yinwang Intelligent Technologies Co., Ltd., Shenzhen (CN)

( * ) Notice: Subject to any disclaimer, the term of this patent is extended or adjusted under 35 U.S.C. 154(b) by 316 days.

(21) Appl. No.: 18/342,497

(22) Filed: Jun. 27, 2023

(65) Prior Publication Data

US 2023/0345239 A1      Oct. 26, 2023

Related U.S. Application Data

(63) Continuation of application No. PCT/CN2020/140012, filed on Dec. 28, 2020.

(51) Int. Cl.
*H04W 12/041* (2021.01)
*H04W 12/03* (2021.01)
*H04W 12/12* (2021.01)

(52) U.S. Cl.
CPC ......... *H04W 12/041* (2021.01); *H04W 12/03* (2021.01); *H04W 12/12* (2013.01)

(58) Field of Classification Search
CPC ... H04W 12/041; H04W 12/03; H04W 12/12; H04W 92/18; H04W 4/046; H04W 12/04; H04W 4/44; H04W 4/48; H04W 12/0433; H04W 4/40; H04L 9/0891; H04L 63/068; H04L 63/1441; H04L 63/1475; H04L 67/12; H04L 9/0822

(Continued)

(56) References Cited

U.S. PATENT DOCUMENTS

| 9,769,664 | B1 | 9/2017 | Kavaler |
| 2005/0066175 | A1* | 3/2005 | Perlman ................. H04L 9/302 |
| | | | 713/176 |

(Continued)

FOREIGN PATENT DOCUMENTS

| CN | 109729056 A | 5/2019 |
| CN | 109936444 A | 6/2019 |

(Continued)

OTHER PUBLICATIONS

Amendments received before examination dated Jun. 18, 2024 for EP 20967247 (Year: 2024).*

(Continued)

*Primary Examiner* — Juan A Torres
(74) *Attorney, Agent, or Firm* — Leydig, Voit & Mayer, Ltd.

(57) ABSTRACT

A data transmission method and apparatus are provided. When the data transmission method is applied to a first device, the method includes: when a fresh value corresponding to a message to be sent by the first device is a first fresh value, updating an encryption key from a first key to a second key, and generating a first keystream based on the first fresh value and the second key; encrypting first data based on the first keystream, to obtain the encrypted first data; generating a first message based on the encrypted first data and the first fresh value; and sending the first message to a second device.

20 Claims, 11 Drawing Sheets

(58) Field of Classification Search
USPC ........................................................ 455/410
See application file for complete search history.

(56) References Cited

U.S. PATENT DOCUMENTS

| | | | |
|---|---|---|---|
| 2007/0297610 A1* | 12/2007 | Chen | H04L 9/083 |
| | | | 380/270 |
| 2010/0054463 A1* | 3/2010 | Tsan | H04L 63/0428 |
| | | | 380/247 |
| 2014/0270163 A1 | 9/2014 | Merchan et al. | |
| 2017/0171178 A1 | 6/2017 | Reynders | |
| 2017/0195875 A1 | 7/2017 | Miklós et al. | |
| 2017/0302452 A1 | 10/2017 | Nanjundappa | |
| 2018/0332471 A1* | 11/2018 | Zhu | H04L 63/061 |
| 2019/0118767 A1 | 4/2019 | Britt | |
| 2020/0005570 A1 | 1/2020 | Troia et al. | |
| 2020/0213287 A1 | 7/2020 | Zhang et al. | |
| 2020/0313873 A1 | 10/2020 | Mondello et al. | |
| 2020/0369242 A1 | 11/2020 | Komedani | |
| 2021/0119981 A1* | 4/2021 | Coppola | H04L 9/088 |
| 2022/0131839 A1* | 4/2022 | Potter | G06F 21/85 |

FOREIGN PATENT DOCUMENTS

| | | | |
|---|---|---|---|
| CN | 110933110 A | 3/2020 |
| CN | 111629359 A | 9/2020 |
| CN | 111698086 A | 9/2020 |
| CN | 111740835 A | 10/2020 |
| JP | 2016100632 A | 5/2016 |
| JP | 2017038143 A | 2/2017 |
| KR | 101882694 B1 | 7/2018 |
| WO | 2012104978 A1 | 8/2012 |
| WO | 2020201010 A1 | 10/2020 |

OTHER PUBLICATIONS

Amended claims filed after receipt of (European) search report dated Jun. 18, 2024 for EP 20967247 (Year: 2024).*
Supplementary European search report dated Dec. 22, 2023 for EP 20967247 (Year: 2023).*
European search opinion dated Dec. 22, 2023 for EP 20967247 (Year: 2023).*
UO "Research and Implementation of Defense Technology for In-vehicle Network of Connected Vehicle," A Master Thesis Submitted to University of Electronic Science and Technology of China, Total 94 pages (2020). With an English abstract.
Ericsson et al., "Use of FRESH in the enhanced UTRAN key hierarchy," 3GPP TSG SA WG3 Security—S3#59, S3-100496, Total 2 pages, 3rd Generation Partnership Project, Valbonne, France (Apr. 26-30, 2010).

* cited by examiner

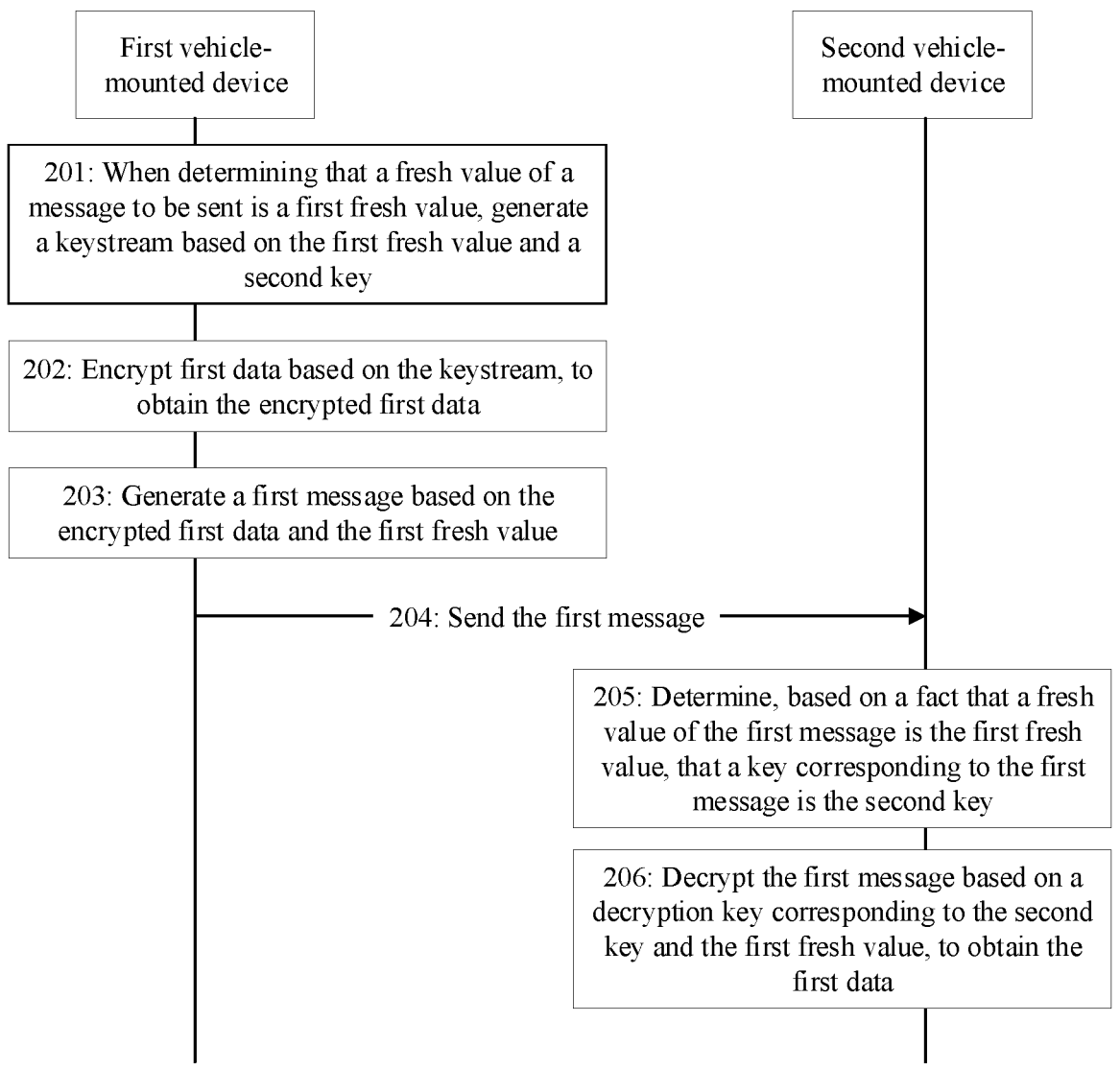

First vehicle-mounted device

Second vehicle-mounted device

201: When determining that a fresh value of a message to be sent is a first fresh value, generate a keystream based on the first fresh value and a second key 202: Encrypt first data based on the keystream, to obtain the encrypted first data 203: Generate a first message based on the encrypted first data and the first fresh value 204: Send the first message 205: Determine, based on a fact that a fresh value of the first message is the first fresh value, that a key corresponding to the first message is the second key 206: Decrypt the first message based on a decryption key corresponding to the second key and the first fresh value, to obtain the first data

FIG. 2

DATA TRANSMISSION METHOD AND APPARATUS

CROSS-REFERENCE TO RELATED APPLICATIONS

This application is a continuation of International Application No. PCT/CN2020/140012, filed on Dec. 28, 2020, the disclosure of which is hereby incorporated by reference in its entirety.

TECHNICAL FIELD

Embodiments of this present disclosure relate to the field of intelligent networked vehicles, and in particular, to a data transmission method and apparatus.

BACKGROUND

With continuous development of intelligence in the entire vehicle industry, especially in the field of autonomous driving or assisted driving, a security requirement for data transmission in a vehicle running process is increasingly high. In a process of communication between vehicle-mounted devices of a vehicle, a malicious attacker may perform eavesdropping, modification, or a replay attack on data transmitted in the process of communication. This severely affects security of autonomous driving or assisted driving of the vehicle.

Currently, when data is transmitted between different vehicle-mounted devices in a vehicle, an attacker's modification or replay attack on the data is not considered. As a result, security of data transmission between the vehicle-mounted devices is low, and it is difficult to meet a security requirement of the intelligent vehicle.

SUMMARY

Embodiments of this present disclosure provide a data transmission method, to improve security of data transmission between different vehicle-mounted devices in a vehicle.

According to a first aspect, a data transmission method is provided, applied to a first device. The first device may be a vehicle-mounted device, a roadside device, a network side device, or the like in a vehicle, or the first device may be a chip in a first vehicle-mounted device, a roadside device, or a network side device. Alternatively, the first device may be a function or module that can implement data transmission between the vehicle and another device. For example, when the method is applied to in-vehicle communication, the first device and a second device may be vehicle-mounted devices in a same vehicle. When the method is applied to vehicle-to-vehicle communication, the first device and the second device may be vehicle-mounted devices of different vehicles. When the method is applied to vehicle-to-vehicle communication, the first device may be a vehicle-mounted device in a vehicle, or may be a network side device. When the method is applied to communication between a vehicle and a roadside device, the first device may be a vehicle-mounted device in the vehicle, or may be the roadside device. When the method is applied to communication between a roadside device and a roadside device or between a roadside device and a network side device, the first device may be the roadside device or the network side device in a vehicle.

The method may include: when a fresh value corresponding to a message to be sent by the first device is a first fresh value, updating an encryption key from a first key to a second key, and generating a first keystream based on the first fresh value and the second key; encrypting first data based on the first keystream, to obtain the encrypted first data; generating a first message based on the encrypted first data and the first fresh value; and sending the first message to the second device.

It should be noted that, before the first device sends the first message, for example, when sends a previous message of the first message, a fresh value corresponding to the message is a previous fresh value of the first fresh value, and the first device may use a moment at which sending of the message is finished as a moment at which the first message is to be sent. Alternatively, when determining, based on a requirement, that the first message needs to be sent, the first device may determine that this moment is a moment at which the first message is to be sent. Alternatively, the first device may further use preset duration before sending the first message as a moment at which the first message is to be sent. The preset duration may be determined based on a time used for generating the first message, or may be determined based on a time used for updating the encryption key from the first key to the second key, or may be determined based on another requirement. This is not limited herein.

According to the foregoing method, the first device can well resolve a problem of a security risk caused by using a same keystream as that used in a historically sent message if the keystream is still derived by using an original key after the fresh value reaches a specific value (for example, the fresh value returns to an initial value due to overflow of the fresh value), thereby effectively improving security of data transmission.

In a possible implementation, the first device may further receive a third message sent by the second device, where the third message includes indication information used to indicate the second device to update the encryption key to the second key; and update, based on the third message, a decryption key from a decryption key corresponding to the first key to a decryption key corresponding to the second key.

According to the foregoing method, the first device may be enabled to determine, based on the received third message sent by the second device, that the second device has updated to the second key, so that the first device can better decrypt the received message of the second device by using the corresponding decryption key corresponding to the second key, so that success rates of encryption and decryption in a process of data transmission between the first device and the second device are improved, and a delay is effectively reduced.

In some embodiments, in a process of decrypting the third message, the first device may update the decryption key from the decryption key corresponding to the first key to the decryption key corresponding to the second key. For example, the first device may decrypt the third message based on the indication information by using the decryption key corresponding to the second key, and when successfully decrypting the third message, the first device updates the decryption key from the decryption key corresponding to the first key to the decryption key corresponding to the second key. In this way, when the third message carries to-be-transmitted data, data transmission is not affected when the first device determines that the second device has updated the key, so that data transmission efficiency and data transmission performance are improved.

In a possible implementation, the first device may further delete the first key based on the third message.

According to the foregoing method, when the first device determines, based on the third message, that the second device has updated the key, the first device may delete the first key, so that occupation of storage space of the first device can be reduced.

In a possible implementation, the third message includes encrypted third data, a fresh value of the third message, and a first identifier, and the indication information is the first identifier.

According to the foregoing method, the first device may determine, based on the first identifier carried in the third message, that the second device has updated to the second key. In this way, when the third message carries the to-be-transmitted third data, when the first device determines that the second device has updated the key, an effect and efficiency of receiving the third data by the first device are improved, and data transmission efficiency and data transmission performance are improved.

In a possible implementation, the third message includes encrypted third data and a fresh value of the third message, and the indication information is a fresh value of the third message that meets a specific condition.

According to the foregoing method, without changing a message format, the first device may determine, based on fresh value of the third message that meets the specific condition and that is carried in the third message, that the second device has updated the key. In this way, decryption may be performed by using the corresponding decryption key corresponding to the second key, so that success rates of encryption and decryption in a process of transmitting the third data between the first device and the second device are improved, and a delay is effectively reduced.

In a possible implementation, the specific condition includes: there is a preset value between the fresh value of the third message and a fresh value of a message that is from the second device and that is last received by the first device.

According to the foregoing method, the first device may determine, based on the preset value between the fresh value of the third message and the fresh value of the message that is from the second device and that is last received by the first device, that the fresh value of the third message meets the specific condition. In this way, it is determined that the second device has updated the key, and efficiency and security of data transmission between the first device and the second device are improved without changing the message format.

In a possible implementation, after sending the first message to the second device, the first device sets a switching identifier to a valid state, and updates, based on the third message and a fact that the switching identifier is the valid state, the decryption key from the decryption key corresponding to the first key to the decryption key corresponding to the second key; and after the first device updates the decryption key from the decryption key corresponding to the first key to the decryption key corresponding to the second key, the first device sets the switching identifier to an invalid state.

According to the foregoing method, considering that a packet loss may occur in a process of data transmission between the first device and the second device, to reduce a false judgment of the first device on the third message, the first device may set the switching identifier to the valid state after sending the first message to the second device. In this way, when the third message is received when the switching identifier is the valid state, it is determined, based on the preset value between the fresh value of the third message and the fresh value of the message that is from the second device and that is last received by the first device, that the fresh value of the third message meets the specific condition. However, after the first device updates the decryption key from the decryption key corresponding to the first key to the decryption key corresponding to the second key, the first device sets the switching identifier to the invalid state. In this case, when the message is received when the switching identifier is the invalid state, based on the preset value between the fresh value of the message and the fresh value of the message that is from the second device and that is last received by the first device, it may be determined that the message may be caused by the packet loss. In this way, efficiency and security of data transmission between the first device and the second device can be better improved.

In a possible implementation, after sending the first message to the second device, the first device may further start a timer. When the timer expires, the first device may update a decryption key from a decryption key corresponding to the first key to the decryption key corresponding to the second key.

In some embodiments, when the first device cannot receive a message sent by the second device for a long time, that is, when the timer expires, the first device may determine to reach a tacit agreement with the second device on using the second key to perform encryption and decryption on messages sent and received by each other. Therefore, in this case, the first device updates the decryption key from the decryption key corresponding to the first key to the decryption key corresponding to the second key. In this way, by using the method for starting the timer, when the message sent by the second device cannot be received for a long time, it is avoided that the decryption key corresponding to the first key is still used to decrypt a subsequently received message of the second device, so that a success rate of decrypting, by the first device, the message sent by the second device is improved.

In a possible implementation, the method further includes: when the timer expires, deleting the first key.

According to the foregoing method, when the first device may determine to reach the tacit agreement with the second device on using the second key to perform encryption and decryption on the messages sent and received by each other (for example, when the timer expires), the first device may delete the first key, so that occupation of storage space of the first device can be reduced.

In a possible implementation, the method further includes: when the timer does not expire, decrypting, by using the decryption key corresponding to the first key, a message sent from the second device to the first device.

According to the foregoing method, when the first device does not reach the tacit agreement with the second device on using the second key to perform encryption and decryption on the messages sent and received by each other (for example, when the timer does not expire), the first device may decrypt, by using the decryption key corresponding to the first key, the message sent from the second device to the first device, so that the success rate of decrypting, by the first device, the message sent by the second device is improved.

In a possible implementation, the method further includes: when the timer does not expire, if the message sent from the second device to the first device cannot be successfully decrypted by using the decryption key corresponding to the first key, decrypting, by using the decryption key corresponding to the second key, the message sent from the second device to the first device.

According to the foregoing method, when the message sent from the second device to the first device cannot be successfully decrypted by using the decryption key corresponding to the first key, the message sent from the second device to the first device is decrypted by using the decryption key corresponding to the second key, so that the success rate of decrypting, by the first device, the message sent by the second device is improved.

In a possible implementation, the method further includes: receiving a fourth message sent by the second device; updating the encryption key from the second key to a third key based on a fact that the fourth message includes a second fresh value, and generating a second keystream based on the third key and a fresh value of a fifth message that is to be sent by the first device and that carries second data; and encrypting the second data based on the second keystream, to obtain the encrypted second data; generating the fifth message based on the encrypted second data and the fresh value; and sending the fifth message to the second device.

Considering that when the second device sends a message to the first device, a security risk may be generated because a fresh value of the message reaches a specific value (for example, the second fresh value), and when the second device sends the fourth message to the first device, a fresh value of the fourth message is the second fresh value. This indicates that when the fresh value is the second fresh value, the second device updates the encryption key from the second key to the third key, and generates the fourth message based on the second fresh value and the third key. Therefore, the first device may update, based on the fact that the fourth message includes the second fresh value, the encryption key from the second key to the third key. When the first device is to send a next message (for example, the fifth message), the first device may generate the fifth message based on the third key and the fresh value of the fifth message that is to be sent and that carries the second data. In this way, when the second device sends the message to the first device, the fresh value of the message between the first device and the second device may also reach the specific value, and the key may be updated, so that security of data transmission is improved.

In a possible implementation, after receiving the fourth message sent by the second device, the first device may further successfully decrypt, based on the fact that the fourth message includes the second fresh value, the fourth message by using a decryption key that matches the third key.

According to the foregoing method, when the fresh value of the fourth message is the second message, the first device may determine that a key of the fourth message is the third key. In this way, the first device may decrypt the fourth message by using a decryption key corresponding to the third key. In this way, when the second device sends the message to the first device, the fresh value of the message between the first device and the second device may also reach the specific value, and the key may be updated, so that security of data transmission is improved, and a success rate of decrypting the fourth message by the first device is also improved.

According to a second aspect, a data transmission method is provided, applied to a second device. The second device may be a vehicle-mounted device, a roadside device, a network side device, or the like in a vehicle, or the second device may be a chip in a vehicle-mounted device, a roadside device, or a network side device. Alternatively, the second device may be a function or module that can implement data transmission between the vehicle and another device. For example, when the method is applied to in-vehicle communication, the second device and a first device may be vehicle-mounted devices in a same vehicle. When the method is applied to vehicle-to-vehicle communication, the second device and the first device may be vehicle-mounted devices of different vehicles. When the method is applied to vehicle-to-vehicle communication, the second device may be a vehicle-mounted device in a vehicle, or may be a network side device. When the method is applied to communication between a vehicle and a roadside device, the second device may be a vehicle-mounted device in the vehicle, or may be the roadside device. When the method is applied to communication between a roadside device and a roadside device or between a roadside device and a network side device, the second device may be the roadside device or the network side device in a vehicle.

The method includes: receiving a first message from the first device, where the first message includes encrypted first data and a fresh value of the first message; updating, based on a fact that the fresh value of the first message is a first fresh value, a decryption key from a decryption key corresponding to a first key to a decryption key corresponding to a second key; and decrypting the first message based on the first fresh value and the decryption key corresponding to the second key, to obtain the first data.

According to the foregoing method, when receiving the first fresh value of the first message, the second device may determine that a key used for the first message is the second key. Therefore, in a process of decrypting the first message, the decryption key may be updated from the decryption key corresponding to the first key to the decryption key corresponding to the second key. In this way, a case in which a new key is used to decrypt a received message after a fresh value reaches a specific value (for example, the fresh value is returned to an initial value due to overflow of the fresh value) is well solved to ensure that a keystream different from that of a historically sent message is used, thereby effectively improving security of data transmission.

In a possible implementation, the method further includes: updating an encryption key from the first key to the second key based on the fact that the fresh value of the first message is the first fresh value; and sending a third message to the first device, where the third message includes third data encrypted by using the second key.

In some embodiments, the second device may directly encrypt the third data by using the second key, to generate the encrypted third data. In some other embodiments, the second device may alternatively generate a third keystream by using the second key and a fresh value of the third message, and encrypt the third data by using the third keystream. This is not limited herein.

According to the foregoing method, after receiving the first message, the second device may update the encryption key from the first key to the second key, so that when generating the third message, the second device may encrypt the third data by using the updated second key. Therefore, it is ensured that after the first device updates to the second key and sends the first message, the second device may encrypt the sent third message based on the updated second key, so that success rates of encryption and decryption in a process of data transmission between the first device and the second device are improved, and a delay is effectively reduced.

In a possible implementation, the third message further includes indication information used to indicate the second device to update the encryption key to the second key.

According to the foregoing method, when the third message carries to-be-transmitted data, the second device may carry the indication information. In this way, after receiving the third message, the first device may determine, based on the indication information, that the second device has updated the key, so that the first device can decrypt the third message based on a decryption key corresponding to the updated second key, so that efficiency of data transmission and security of data transmission are improved.

In a possible implementation, the third message further includes a first identifier, and the indication information is the first identifier.

According to the foregoing method, the second device may carry the first identifier in the third message, to indicate that the second device has updated the key, so that an effect and efficiency of receiving the third data by the first device are improved.

In a possible implementation, the third message further includes a fresh value of the third message, and the indication information is a fresh value of the third message that meets a specific condition.

According to the foregoing method, the second device may carry, in the third message, the fresh value of the third message that meets the specific condition, and send the indication information without changing a message format, so that message overheads are reduced.

In a possible implementation, the specific condition includes: there is a preset value between the fresh value of the third message and a fresh value of a message that is last sent by the second device to the first device.

According to the foregoing method, the second device may set the fresh value of the third message to the preset value between the fresh value of the third message and the fresh value of the message that is last sent by the second device to the first device, so that after receiving the third message, the second device may determine, based on the preset value between the fresh value of the third message and the fresh value of the message that is last received by the first device, that the fresh value of the third message meets the specific condition, and then determine that the second device has updated the key. In this way, the decryption key corresponding to the second key may be used for decryption, so that success rates of encryption and decryption in a process of transmitting the third data between the first device and the second device are improved, and a delay can be effectively reduced.

According to a third aspect, a data transmission apparatus is provided, and the apparatus may be a first device. The data transmission apparatus may include a communication unit, an encryption unit, and a key updating unit. Optionally, the data transmission apparatus may further include a decryption unit. The key updating unit is configured to: when a fresh value corresponding to a message to be sent by the first device is a first fresh value, update an encryption key from a first key to a second key; the encryption unit is configured to: generate a first keystream based on the first fresh value and the second key, and encrypt first data based on the first keystream, to obtain the encrypted first data; a generation unit is configured to generate a first message based on the encrypted first data and the first fresh value; and the communication unit is configured to send the first message to a second device.

In a possible implementation, the communication unit is further configured to receive a third message sent by the second device, where the third message includes indication information used to indicate the second device to update the encryption key to the second key; and the key updating unit is further configured to update, based on the third message, a decryption key from a decryption key corresponding to the first key to a decryption key corresponding to the second key.

In a possible implementation, the key updating unit is further configured to delete the first key based on the third message.

In a possible implementation, the third message includes encrypted third data, a fresh value of the third message, and a first identifier, and the indication information is the first identifier.

In a possible implementation, the third message includes encrypted third data and a fresh value of the third message, and the indication information is a fresh value of the third message that meets a specific condition.

In a possible implementation, the specific condition includes: there is a preset value between the fresh value of the third message and a fresh value of a message that is from the second device and that is last received by the first device.

In a possible implementation, after the communication unit sends the first message to the second device, the key updating unit is further configured to: set a switching identifier to a valid state; and update, based on the third message and a fact that switching identifier is the valid state, the decryption key from the decryption key corresponding to the first key to the decryption key corresponding to the second key; and after the decryption key is updated from the decryption key corresponding to the first key to the decryption key corresponding to the second key, set the switching identifier to an invalid state.

In a possible implementation, after the communication unit sends the first message to the second device, the key updating unit is further configured to: start a timer; and when the timer expires, update a decryption key from a decryption key corresponding to the first key to a decryption key corresponding to the second key.

In a possible implementation, the key updating unit is further configured to: when the timer expires, delete the first key.

In a possible implementation, the apparatus further includes a decryption unit; and the decryption unit is configured to: when the timer does not expire, decrypt, by using the decryption key corresponding to the first key, a message sent from the second device to the first device.

In a possible implementation, the decryption unit is further configured to: when the timer does not expire, if the message sent from the second device to the first device cannot be successfully decrypted by using the decryption key corresponding to the first key, decrypt, by using the decryption key corresponding to the second key, the message sent from the second device to the first device.

In a possible implementation, the communication unit is further configured to: receive a fourth message sent by the second device; and send a fifth message to the second device; the key updating unit is further configured to update the encryption key from the second key to a third key based on a fact that the fourth message includes a second fresh value; the encryption unit is further configured to: generate a second keystream based on the third key and a fresh value of the fifth message that is to be sent by the second device and that carries second data; and encrypt the second data based on the second keystream, to obtain the encrypted second data; and the generation unit is further configured to generate the fifth message based on the encrypted second data and the fresh value.

In a possible implementation, the apparatus further includes the decryption unit. After the communication unit receives the fourth message sent by the second device, the decryption unit is further configured to successfully decrypt, based on the fact that the fourth message includes the second fresh value, the fourth message by using a decryption key that matches the third key.

According to a fourth aspect, a data transmission apparatus is provided, and the apparatus may be a second device. The apparatus includes a communication unit, a decryption unit, and a key updating unit. Optionally, the data transmission apparatus may further include an encryption unit. The communication unit is configured to receive a first message from a first device, where the first message includes encrypted first data and a fresh value of the first message; the key updating unit is configured to update, based on a fact that the fresh value of the first message is a first fresh value, a decryption key from a decryption key corresponding to a first key to a decryption key corresponding to a second key; and the decryption unit is configured to decrypt the first message based on the first fresh value and the decryption key corresponding to the second key, to obtain the first data.

In a possible implementation, the key updating unit is further configured to update an encryption key from the first key to the second key based on the fact that the fresh value of the first message is the first fresh value; and the communication unit is further configured to send a third message to the first device, where the third message includes third data encrypted by using the second key.

In a possible implementation, the third message further includes indication information used to indicate the second device to update the encryption key to the second key.

In a possible implementation, the third message further includes a first identifier, and the indication information is the first identifier.

In a possible implementation, the third message further includes a fresh value of the third message, and the indication information is a fresh value of the third message that meets a specific condition.

In a possible implementation, the specific condition includes: there is a preset value between the fresh value of the third message and a fresh value of a message that is last sent by the second device to the first device.

According to a fifth aspect, a data transmission apparatus is provided, including a processor and a communication interface. The communication interface is configured to: receive a signal from another communication apparatus other than the data transmission apparatus, and transmit the signal to the processor, or send a signal from the processor to the another communication apparatus other than the data transmission apparatus. The processor is configured to implement, by using a logic circuit or executing a code instruction, the method according to any one of the implementations of the first aspect or the method according to any one of the implementations of the second aspect.

According to a sixth aspect, a data transmission apparatus is provided. The apparatus may include a processor, the processor is connected to a memory, the memory is configured to store a computer program, and the processor is configured to execute the computer program stored in the memory, to enable the apparatus to perform the method according to any one of the implementations of the first aspect or implement the method according to any one of the implementations of the second aspect.

According to a seventh aspect, a vehicle is provided. The vehicle includes the data transmission apparatus according to the third aspect or the fifth aspect, or includes the data transmission apparatus according to the fourth aspect or the sixth aspect.

According to an eighth aspect, a computer-readable storage medium is provided. The computer-readable storage medium stores a computer program, and when the computer program is run, the method according to any one of the implementations of the first aspect or the method according to any one of the implementations of the second aspect is implemented.

According to a ninth aspect, a computer program product is provided. The computer program product includes a computer program or instructions, and when the computer program or the instructions are executed by a communication apparatus, the method according to any one of the implementations of the first aspect or the method according to any one of the implementations of the second aspect is implemented.

According to a tenth aspect, a chip is provided. The chip may include a processor and an interface, and the processor is configured to read instructions through the interface, to perform the method according to any one of the implementations of the first aspect or implement the method according to any one of the implementations of the second aspect.

For specific beneficial effects of the second aspect to the tenth aspect, refer to technical effects that can be achieved in the corresponding possible implementations of the first aspect or the second application. Details are not described herein again.

BRIEF DESCRIPTION OF DRAWINGS

FIG. 2 is a schematic flowchart of a data transmission method according to an embodiment;

DESCRIPTION OF EMBODIMENTS

Figure 1:
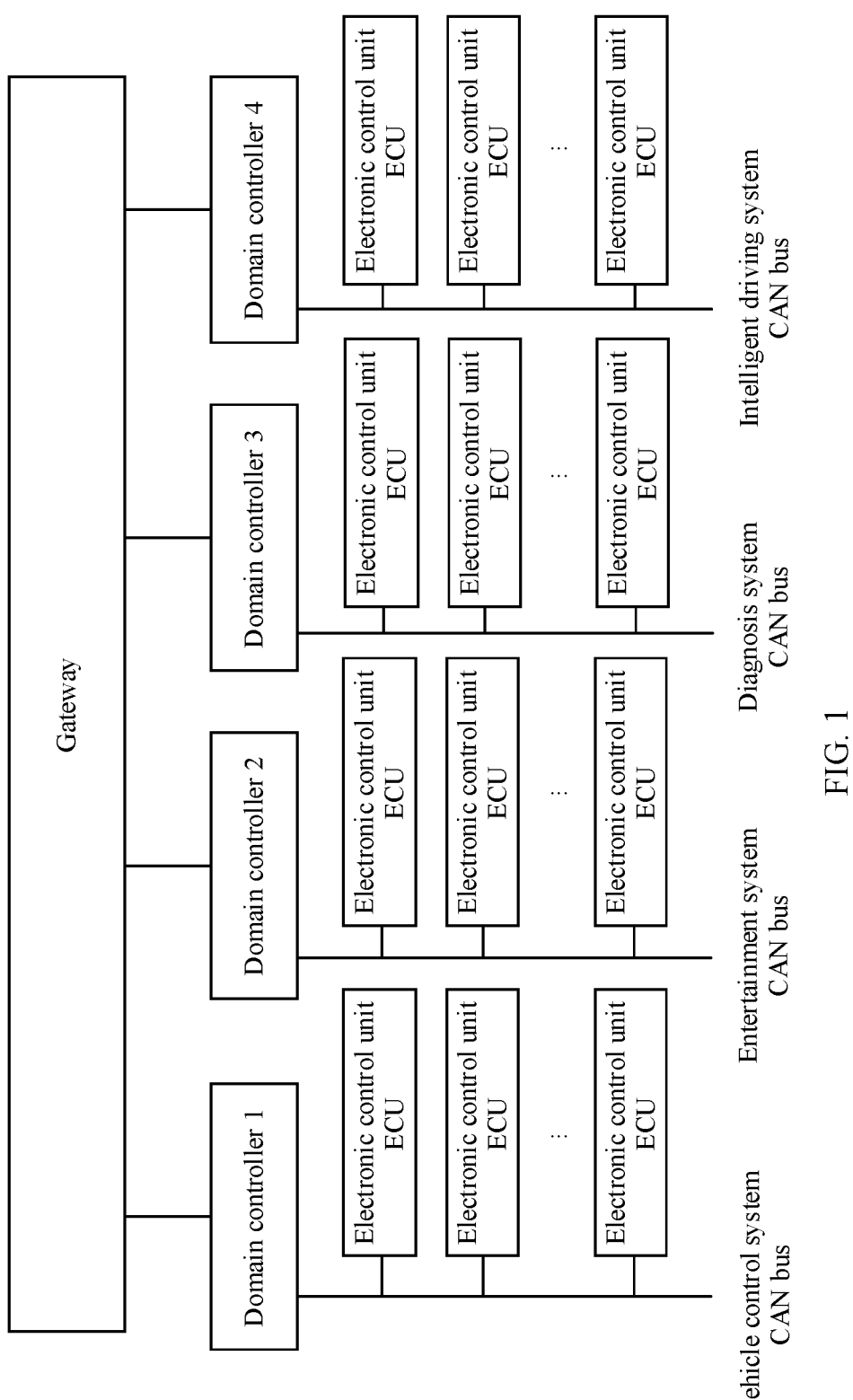
FIG. 1 shows an E/E architecture to which an embodiment is applicable.

In the following, some terms in this present disclosure are explained and described, to facilitate understanding of the terms for a person skilled in the art.

1. Replay Attack

A replay attack, also referred to as a playback attack or repeat attack, indicates that an attacker sends a packet that has been received by a destination host to spoof a system, and is mainly used to damage authentication correctness in an identity authentication process.

A basic principle of the replay attack is as follows: Data that is eavesdropped is resent to a receiver. For example, the system simply encrypts authentication information before transmitting the authentication information. In this case, although the attacker cannot eavesdrop on a password, the attacker can intercept the encrypted password and replay the encrypted password to launch an effective attack in such a manner.

2. Keystream

A long keystream is generated by using a short random key (also referred to as an actual key or a seed key), and the long keystream is used to encrypt plaintext or decrypt ciphertext, so that the short key can be used to encrypt longer plaintext or decrypt longer ciphertext. The short random key may be a key determined by a sender and the receiver through negotiation, or may be a key correspondingly set based on an identifier of the receiver, or may be a key correspondingly set based on an identifier of the sender. This is not limited herein. In this present disclosure, the sender and the receiver may be vehicle-mounted devices.

3. Exclusive OR (Xor) Operation

A mathematical symbol of exclusive OR is $\oplus$. If a and b are different, an exclusive OR result is 1; or if a and b are the same, an exclusive OR result is 0.

4. Least Significant Bit (LSB)

An LSB refers to the 0th bit (namely, least significant bit) in a binary digit and has a weight of $2^0$. In a big-endian scenario, that is, when a high-order byte is placed in a low address of a memory and a low-order byte is placed in a high address of the memory, the LSB refers to a rightmost bit.

5. Most Significant Bit (MSB)

An MSB refers to the $(n-1)^{th}$ bit in an n-bit binary digit and has a highest weight $2^{(n-1)}$. The MSB and the LSB are corresponding concepts. In the big-endian scenario, the MSB refers to a leftmost bit.

In this present disclosure, "at least one" means one or more, and "a plurality of" means two or more. "At least one of the following items (pieces)" or a similar expression thereof refers to any combination of these items, including any combination of singular items (pieces) or plural items (pieces). For example, at least one of a, b, or c may indicate a, b, c, a and b, a and c, b and c, or a, b, and c, where a, b, and c may be singular or plural. In addition, "and/or" describes an association relationship between associated objects, and represents that three relationships may exist. For example, A and/or B may represent the following cases: Only A exists, both A and B exist, and only B exists, where A and B may be singular or plural. In the text descriptions of this present disclosure, the character "/" generally indicates an "or" relationship between the associated objects. In a formula in this present disclosure, the character "/" indicates a "division" relationship between the associated objects.

It may be understood that various numbers in embodiments of this present disclosure are merely used for differentiation for ease of description, and are not used to limit the scope of embodiments of this present disclosure. The sequence numbers of the foregoing processes do not mean execution sequences, and the execution sequences of the processes should be determined based on functions and internal logic of the processes. The terms "first", "second", and the like are used to distinguish between similar objects, and do not need to be used to describe a specific order or sequence. In addition, the terms "include", "have", and any variant thereof are intended to cover non-exclusive inclusion, for example, include a series of steps or modules. Methods, systems, products, or devices are not necessarily limited to those steps or modules that are clearly listed, but may include other steps or modules that are not clearly listed or that are inherent to such processes, methods, products, or devices.

FIG. 1 is a schematic diagram of an architecture of a communication system to which an embodiment of this present disclosure is applicable. For example, the communication system is an electronic and electrical (E/E) system. The communication system may include a gateway, a domain controller, an electronic control unit (ECU), and at least one controller local area network (CAN) bus protocol bus. The communication system may be divided into a plurality of different domains based on functions. Each domain may include at least one domain controller, and each domain controller is configured to manage a plurality of ECUs connected to one or more CAN buses in a domain. As shown in FIG. 1, a domain controller 1 is configured to manage a plurality of ECUs connected to a vehicle control system CAN bus in a domain, a domain controller 2 is configured to manage a plurality of ECUs connected to an entertainment system CAN bus in a domain, a domain controller 3 is configured to manage a plurality of ECUs connected to a diagnosis system CAN bus in a domain, and a domain controller 4 is configured to manage a plurality of ECUs connected to an intelligent driving system CAN bus in a domain. The domain controller can also be an ECU. Each domain controller in the communication system belongs to the gateway. As shown in FIG. 1, the domain controller 1, the domain controller 2, the domain controller 3, and the domain controller 4 separately belong to the gateway. For example, the gateway is configured to isolate an ECU outside the communication system from the communication system, and can implement protocol conversion between the ECUs in the communication system. The gateway may also be an ECU. FIG. 1 is only a schematic diagram. The communication system may further include another device, for example, may further include a relay device, which is not shown in FIG. 1. Quantities of gateways, domain controllers, and ECUs connected to various CAN buses that are included in the communication system are not limited in this present disclosure.

The communication system may include a vehicle having a communication function, a vehicle-mounted device, a wireless terminal in self driving, an in-vehicle network chip, and the like. A scenario to which the communication system is applicable is not limited in this present disclosure. It should be noted that system architectures and application scenarios described in this present disclosure are intended to describe the technical solutions in this present disclosure more clearly, but are not intended to limit the technical solutions provided in this present disclosure. A person of ordinary skill in the art may know that as system architectures evolve and a new scenario emerges, the technical solutions provided in this present disclosure are also applicable to a similar technical problem.

A vehicle-mounted device in this present disclosure may be a device or a module placed or installed on a vehicle. For a vehicle that can perform an autonomous driving function, a driving decision may be implemented after information collected by a vehicle-mounted device like a sensor is processed by an ADAS system and a mobile data center (MDC).

In addition, a plurality of ECUs included in an in-vehicle network of a vehicle may also be considered as vehicle-mounted devices. The information collected by the vehicle-mounted device like the sensor in the vehicle may alternatively be processed by using the ECU, and then sent to a processor of the ADAS system or a processor of the MDC for processing. For another example, the vehicle-mounted device may alternatively be a gateway controller. The gateway controller acts as a data interaction hub for a vehicle network, and can route network data such as a vehicle-mounted controller area network (CAN), a local interconnect network (LIN), media oriented system transport (MOST), and a vehicle-mounted network FlexRay in different networks. The gateway controller may be set independently, to improve scalability of a vehicle topology structure, vehicle security, and confidentiality of vehicle network data. For example, the gateway controller may be a vehicle-mounted intelligent terminal (telematics BOX, T-BOX). The vehicle-mounted intelligent terminal is mainly used for communication between a vehicle and an internet of vehicles service platform, and may include modules such as on-board diagnostics (OBD), a microcontroller unit (MCU)/central processing unit (CPU), a memory, and a communication interface. Each device or module inside the vehicle is connected to the CAN bus to implement transmission of instructions and information; and the outside of the vehicle is interconnected with a terminal device through a cloud platform to implement information interaction inside and outside the vehicle.

It should be noted that the communication system to which this embodiment of this present disclosure is applicable is not limited to an in-vehicle network communication system based on the E/E architecture shown in FIG. 1, or may be an in-vehicle network communication system based on another architecture form, or may be an out-vehicle network communication system, for example, communication between a vehicle and a vehicle, between a vehicle and a network side device, between a vehicle and a road side device, between a road side device and a road side device, or between a road side device and a network side device.

A possible scenario of this present disclosure may be data transmission between vehicle-mounted devices in a vehicle. The data transmission may be wired transmission through, for example, a CAN bus, or may be wireless transmission. This is not limited herein. For example, data is transmitted between a first vehicle-mounted device and a second vehicle-mounted device. The first vehicle-mounted device may be a vehicle-mounted camera, the second vehicle-mounted device may be a mobile data center MDC, and the transmitted data may be video image data. Considering that the data transmitted between the first vehicle-mounted device and the second vehicle-mounted device may be media data used in a scenario such as autonomous driving, a security requirement for the data transmitted between the first vehicle-mounted device and the second vehicle-mounted device is high, and data integrity and data security need to be verified. In addition, considering a delay requirement of autonomous driving, a data volume of media data transmitted by the first vehicle-mounted device to the second vehicle-mounted device is large, a data transmission rate is also quite high, and a requirement for data security verification is further improved.

In a possible implementation, a fresh value may be set for each vehicle-mounted device when a message is sent. For example, a fresh value of the first vehicle-mounted device may be used to record a quantity of times that the first vehicle-mounted device sends messages to the second vehicle-mounted device, and a fresh value of the second vehicle-mounted device may be used to record a quantity of times that the second vehicle-mounted device sends messages to the first vehicle-mounted device. In some embodiments, the first vehicle-mounted device locally maintains a counter, and the counter is configured to record a quantity of times that the first vehicle-mounted device sends a message. For example, the first vehicle-mounted device sends a first message, and the counter of the first vehicle-mounted device increases the fresh value of the first vehicle-mounted device by 1. For example, when sending first messages, the first vehicle-mounted device may allocate corresponding fresh values to different first messages based on a time sequence. For example, based on the time sequence, the first messages sent by the first vehicle-mounted device are respectively a message A, a message B, and a message C. The first vehicle-mounted device may allocate a fresh value 00000000 of the message A to the message A. The first vehicle-mounted device may allocate a fresh value 00000001 of the message B to the message B. The first vehicle-mounted device may allocate a fresh value 00000010 of the message C to the message C.

The first vehicle-mounted device determines a keystream by using the fresh value of the first message and a key (for example, the foregoing seed key), encrypts first data by using the keystream, to obtain the encrypted first data, generates a first message by using the encrypted first data and the fresh value of the first message, and transmits the first message to the second vehicle-mounted device, so that a keystream used by the first vehicle-mounted device to send the first message each time is different, so that security of transmitting encrypted data by the first vehicle-mounted device is improved, a possibility that the first message transmitted by the first vehicle-mounted device is eavesdropped and tampered with is reduced. Even if the encrypted first data is stolen by an attacker, the first data cannot be decrypted.

In addition, the second vehicle-mounted device may compare a fresh value of a received first message with a fresh value of a last received first message stored locally, to determine whether a currently received first message is a replay message. For example, a scenario in which the fresh value of the first vehicle-mounted device increases based on a quantity of times of sending messages is used as an example. If a fresh value of the currently received first message is greater than a fresh value of a last received first message locally stored in the second vehicle-mounted device, or if the fresh value of the first message and the fresh value of the last received first message locally stored in the second vehicle-mounted device are in ascending order, the second vehicle-mounted device considers that the currently received first message is not tampered with. For example, when receiving the message A, the second vehicle-mounted device may store the fresh value 00000000 of the message A. When the message B is received, it may be first verified whether the fresh value 01 of the message B is higher than the stored fresh value 00000000. If the fresh value of the message B is greater than the stored fresh value, it indicates that the currently received message B is fresh. Otherwise, it is considered that the currently received message B is not fresh, and a person illegally resends a transmitted message (for example, the message A). The foregoing process is a replay attack process. A fresh value is added to the first message, so that a replay attack can be prevented, and data security can be improved.

However, a length of the fresh value is limited (generally 24 bits). After the fresh value of the first message reaches a first fresh value, the fresh value of the first message is the same as a fresh value of a first message in history. The first fresh value may be one or more specific values in an optional range of the fresh value. For example, the first fresh value may be an initial value of the fresh value. In this case, when the fresh value is returned to the initial value due to overflow of the fresh value (for example, when the fresh value is a sequence number, the sequence number is reversed), if the keystream is still derived by using an original key, a case in which the keystream is the same as that used in a historically sent message may occur, thereby causing a security risk. Particularly, in a vehicle-mounted wired transmission scenario, because a transmission rate is quite high, a frequency of returning an initial value when a fresh value overflows is faster. It is estimated at a rate of 10 Gbps. Assuming that the fresh value is 24 bits, a quantity of data packets sent per second is 500,000, that is, the initial value is returned when the fresh value overflows once every 33.56 seconds.

Based on this, in this embodiment of this present disclosure, that the first vehicle-mounted device sends the first message is used as an example. Before sending the first message, the first vehicle-mounted device generates, by using a first key, a keystream used to encrypt to-be-sent data. Correspondingly, the second vehicle-mounted device decrypts the received first message based on the first key. When determining that the fresh value corresponding to the first message to be sent is the first fresh value, the first vehicle-mounted device encrypts, by using an updated second key (the second key is different from the first key), the first data to be sent to the second vehicle-mounted device, and generates the first message based on the encrypted first data and the first fresh value. After receiving the first message, the second vehicle-mounted device determines, based on a fact that the fresh value of the first message is the first fresh value, to decrypt the first message by using the updated second key.

For example, the fresh value of the first message is 8 bits, and the initial value is set to 00000000. Each time the first vehicle-mounted device sends a data packet to the second vehicle-mounted device, the fresh value of the first message is accumulated once. For example, when the first vehicle-mounted device sends the first data packet to the second vehicle-mounted device, the fresh value of the first message is 00000000. When the first vehicle-mounted device sends the second data packet to the second vehicle-mounted device, the fresh value of the first message is 00000001. When the first vehicle-mounted device sends the 28 data packet to the second vehicle-mounted device, the fresh value of the first message is 11111111. In other words, before the fresh value of the first message reaches the 00000000 again, the first vehicle-mounted device performs encryption operation by using the first key, to generate the first message, and the second vehicle-mounted device performs decryption operation by using the first key, to parse the first message. When the first vehicle-mounted device sends a next data packet to the second vehicle-mounted device, the fresh value of the first message is 00000000 again, that is, the fresh value of the first message reaches the first fresh value. In this case, the first vehicle-mounted device performs encryption operation by using the updated second key, to generate the first message, and the second vehicle-mounted device performs decryption operation by using the updated second key, to parse the first message.

Correspondingly, that the second vehicle-mounted device sends a second message to the first vehicle-mounted device is used as an example. Before sending the second message, the second vehicle-mounted device generates, by using a third key, the keystream used to encrypt the to-be-sent data. Correspondingly, the first vehicle-mounted device decrypts the received second message based on the third key. When determining that a fresh value corresponding to the second message to be sent is a second fresh value, the second vehicle-mounted device encrypts, by using an updated fourth key (the fourth key is different from the third key), second data to be sent to the first vehicle-mounted device, and generates the second message based on the encrypted second data and the second fresh value. After receiving the second message, the first vehicle-mounted device determines, based on a fact that the fresh value of the second message is the second fresh value, to decrypt the second message by using the updated fourth key.

According to the foregoing method, a problem that a security risk exists because the original key is still used after the fresh value reaches the specific value can be well resolved.

A key (including the first key and the second key) used by the first vehicle-mounted device to encrypt the to-be-sent data and a key (including the third key and the fourth key) used by the second vehicle-mounted device to encrypt the to-be-sent data may be two sets of keys maintained by the first vehicle-mounted device and the second vehicle-mounted device respectively (Scenario 1), or may be a same set of keys jointly maintained by the first vehicle-mounted device and the second vehicle-mounted device (Scenario 2). The following separately describes Scenario 1 and Scenario 2 in detail.

Scenario 1: An update of the first key to the second key is only triggered by changing the fresh value of the first message to the first fresh value, and an update of the third key to the fourth key is only triggered by changing the fresh value of the second message to the second fresh value. In this way, it is ensured that when a fresh value corresponding to a message to be sent by each of the first vehicle-mounted device and the second vehicle-mounted device reaches the specific value, the first vehicle-mounted device uses the second key to send data, and the second vehicle-mounted device uses the fourth key to send data In this way, it is ensured that a keystream is not repeated with the fresh value, and security of data transmission between the first vehicle-mounted device and the second vehicle-mounted device is improved.

Scenario 2: The first vehicle-mounted device and the second vehicle-mounted device perform encryption and decryption operation by using a set of keys jointly maintained when sending messages to each other. The fresh value of the first message sent by the first vehicle-mounted device changes to the first fresh value, and the fresh value of the second message sent by the second vehicle-mounted device changes to the second fresh value. When either of the two trigger events occurs, the first vehicle-mounted device and the second vehicle-mounted device update the jointly maintained key.

For example, before a moment 1, the first vehicle-mounted device and the second vehicle-mounted device perform, based on the first key, encryption and decryption on messages sent and received between each other. At the moment 1, if the first vehicle-mounted device determines that the fresh value corresponding to the first message to be sent to the second vehicle-mounted device changes to the first fresh value again, the first vehicle-mounted device updates a key used for generating the first message from the first key to the second key, and then sends the first message to the second vehicle-mounted device. It is assumed that there is no message interaction between the first vehicle-mounted device and the second vehicle-mounted device between the moment 1 and a moment 2, and the first vehicle-mounted device reaches a tacit agreement with the second vehicle-mounted device on using the updated second key to perform encryption and decryption on the messages sent and received by each other. At the moment 2, if the second vehicle-mounted device determines that the fresh value corresponding to the second message sent by the first vehicle-mounted device changes to the second fresh value again, the second vehicle-mounted device updates a key used for generating the second message from the second key to the third key, and then sends the second message to the first vehicle-mounted device. Based on an updated third key and a fact that the fresh value of the second message is the second fresh value, after the moment 2, the first vehicle-mounted device reaches a tacit agreement with the second vehicle-mounted device on using the updated third key to perform encryption and decryption of the messages sent and received by each other.

The following specifically describes a key generation manner in this embodiment of this present disclosure.

In Scenario 1, the first vehicle-mounted device updates the first key only by relying on a fact that the fresh value of the first message reaches the first fresh value, and the second vehicle-mounted device updates the third key only by relying on a fact that the fresh value of the second message reaches the second fresh value.

In some embodiments, when the vehicle is started or the vehicle is initialized, a stored initial key of data that is sent by the first vehicle-mounted device to the second vehicle-mounted device may be used as the first key (that is, a key in which the fresh value of the first message does not reach the first fresh value) that reaches the specific value for the first time before the first vehicle-mounted device sends the data to the second vehicle-mounted device. A first key updated for the 0th time may be a preset key, or may be a key generated for the first time when the vehicle is started. This is not limited herein.

In some embodiments, when the vehicle is started or the vehicle is initialized, a stored initial key of data that is sent by the second vehicle-mounted device to the first vehicle-mounted device as the third key (that is, a key in which the fresh value of the second message does not reach the second fresh value) that reaches the specific value for the first time before the second vehicle-mounted device sends the data to the first vehicle-mounted device. A third key updated for the 0th time may be a preset key, or may be a key generated for the first time when the vehicle is started. This is not limited herein.

In this embodiment of this present disclosure, there may be a plurality of manners for determining an updated key. The following uses Manner A and Manner B as an example to describe a manner of generating the second key. For a manner of generating the fourth key, refer to the manner of generating the second key. Details are not described herein again.

Manner A: The first vehicle-mounted device updates, based on an old key, a new key (the second key) used for encryption operation when the first message is generated, and the second vehicle-mounted device updates, based on the old key, the new key (the second key) used for decryption operation when the first message is parsed.

Manner A1: Considering that it takes a specific time to derive the new key, in a process of generating the second key, the first vehicle-mounted device and the second vehicle-mounted device may generate the second key at a specific time in advance before the fresh value of the first message reaches the first fresh value. Correspondingly, in a process of updating the third key to the fourth key, the first vehicle-mounted device and the second vehicle-mounted device may generate the fourth key at a specific time in advance before the fresh value of the second message reaches the second fresh value.

For example, a first threshold may be set to a specific fresh value, for example, 10000000. When determining that the first fresh value is 10000000, the first vehicle-mounted device may determine that the fresh value of the first message is to reach the first fresh value. Correspondingly, when the second fresh value reaches a second threshold, it is determined that the fresh value of the second message will reach the second fresh value. At this time, a step to update the key may be initiated. It should be noted that the first threshold can be determined based on a value range of the first fresh value and an update frequency of the first fresh value, and the second threshold can also be determined based on a value range of the second fresh value and an update frequency of the second fresh value. Certainly, it may alternatively be determined in another manner. This is not limited herein.

In some embodiments, the currently used first key may be derived based on a key derivation algorithm, to obtain the updated second key. Herein, the key derivation algorithm may be pre-agreed on by the first vehicle-mounted device and the second vehicle-mounted device. For example, the key derivation algorithm may be a key derivation function (KDF). Optionally, the key derivation algorithm may further include a first parameter. The first parameter may include one or more of a quantity of times of updating the key, a CAN identifier, and an ECU identifier. Certainly, the key derivation algorithm may further include another parameter, for example, a parameter like an authentication credential of the first vehicle-mounted device or the second vehicle-mounted device. The CAN identifier is an identifier of a CAN bus connected to the first vehicle-mounted device. With reference to FIG. 1, if the first vehicle-mounted device is the ECU connected to the vehicle control system CAN bus, the identifier of the CAN is an identifier of the vehicle control system CAN bus; or if the first vehicle-mounted device is the ECU connected to the diagnosis system CAN bus, the identifier of the CAN is an identifier of the diagnosis system CAN bus. The ECU identifier may uniquely identify one ECU, that is, an identifier of the first vehicle-mounted device.

It should be noted that, in a specific implementation process, the second key may be generated based on the currently used first key, or may be generated based on at least one another old key that has been used historically. Certainly, the second key may be generated in another manner. This is not limited herein. It only needs to be ensured that a manner of generating the second key by the first vehicle-mounted device is the same as a manner of generating the second key by the second vehicle-mounted device.

Manner A2: To reduce resources used for the first vehicle-mounted device and the second vehicle-mounted device to derive a key, the key may also be preset in the first vehicle-mounted device and the second vehicle-mounted device. That is, a group of sequential keys may be predetermined, and are pre-configured in the first vehicle-mounted device and the second vehicle-mounted device. When the first vehicle-mounted device or the second vehicle-mounted device needs to update the key, a new key is sequentially selected from the pre-configured group of sequential keys.

Optionally, after determining that the first data in the first message is encrypted by using the second key, the first vehicle-mounted device may delete the first key. After the first vehicle-mounted device deletes the first key, the first vehicle-mounted device may encrypt the data based on the currently used second key as the first key when the fresh value of the first message does not reach a next first fresh value, and until a fresh value of a next first message reaches the first fresh value, then perform a step of encrypting the first data by using a next updated second key to generate the first message, to reduce overheads of the first vehicle-mounted device.

Correspondingly, after determining that the first data in the first message is successfully decrypted by using the second key, the second vehicle-mounted device may delete the first key. After the second vehicle-mounted device deletes the first key, the second vehicle-mounted device may decrypt the first data in the received first message based on the currently used second key as the first key when the fresh value of the first message does not reach the next first fresh value, and until the fresh value of the next first message reaches the first fresh value, then perform the step of decrypting the first data in the first message by using the next updated second key, to reduce overheads of the second vehicle-mounted device.

Optionally, after determining that the second data in the second message is encrypted by using the fourth key, the second vehicle-mounted device may delete the third key. After the second vehicle-mounted device deletes the third key, the second vehicle-mounted device may encrypt the data based on the currently used fourth key as the third key when the fresh value of the second message does not reach a next second fresh value, and until a fresh value of a next second message reaches the second fresh value, then perform a step of encrypting the second data by using a next updated fourth key to generate the second message, to reduce overheads of the second vehicle-mounted device.

After determining that a message from the second vehicle-mounted device is successfully decrypted by using the fourth key, the first vehicle-mounted device may delete the third key. After the first vehicle-mounted device deletes the third key, the first vehicle-mounted device may decrypt the second data in the received second message based on the currently used fourth key as the third key when the fresh value of the second message does not reach the next second fresh value, and until the fresh value of the next second message reaches the second fresh value, then perform the step of encrypting the first data by using the next updated fourth key to generate the first message, to reduce overheads of the first vehicle-mounted device.

Manner B: The first vehicle-mounted device and the second vehicle-mounted device may determine an update manner of the second key based on a quantity of update times of the second key, to generate the second key.

In some embodiments, each time the second key is determined, the first parameter in a used key derivation function is related to the quantity of update times of the second key (or a quantity of times that the fresh value of the first message reaches the first fresh value). That is, when the fresh value of the first message is the first fresh value, when the quantity of update times of the second key is determined, the update manner of the second key is determined based on the quantity of update times of the second key, and second key is determined.

For example, in some embodiments, a second key updated each time may be generated based on a second key (that is, the currently used first key) updated last time, or may be generated based on the initial key and at least one second key updated historically. For example, an operation is performed on the initial key, at least one second key updated before the first N−1 times, and the first parameter by using a key derivation algorithm, to generate a second key obtained after the $N^{th}$ update, where N is a positive integer. For the first parameter, refer to the implementation in Manner A. The first parameter may further include the quantity of update times of the second key. This is not limited herein. The initial key is a key determined by the first vehicle-mounted device and the second vehicle-mounted device during initialization, or may be a key written by the first vehicle-mounted device and the second vehicle-mounted device into firmware. It may also be understood that, input of the key derivation algorithm includes the initial key, the at least one second key updated before first N−1 times, the quantity of update times of the second key, and the first parameter, and the second key obtained after the $N^{th}$ update is output.

It should be noted that the quantity of update times of the second key may be counted by using a counter. Certainly, the quantity of update times of the second key may be determined in another manner. This is not limited herein. Certainly, the update manner of the second key may be determined in another manner based on the quantity of update times of the second key. This is not limited in this present disclosure.

Optionally, when determining to use the second key updated after the $N^{th}$ time for encryption and decryption, the first vehicle-mounted device and the second vehicle-mounted device may delete a key obtained after the $(N-1)^{th}$ update, to reduce occupation of storage space.

Correspondingly, the second vehicle-mounted device may alternatively determine a quantity of update times of the fourth key and a manner of generating the fourth key based on a quantity of times that the fresh value of the second message reaches the second fresh value, to generate the fourth key. Correspondingly, when the fresh value of the second message is the second fresh value, the second vehicle-mounted device updates the quantity of update times of the fourth key, and determines the fourth key. For example, a fourth key updated each time may be generated based on a fourth key updated last time (that is, a currently used third key), or may be generated based on the initial key and at least one fourth key updated historically. For example, an operation is performed on the initial key, at least one fourth key updated before first M−1 times, and the first parameter by using a key derivation algorithm, to generate the fourth key obtained after the $M^{th}$ update, where M is a positive integer.

It should be noted that, in Manner B, the first vehicle-mounted device and the second vehicle-mounted device may refer to Manner A1. Before the fresh value of the first message reaches the first fresh value, the first vehicle-mounted device and the second vehicle-mounted device separately derive the second key. When the fresh value of the first message reaches the first fresh value, a quantity of update times of the first key is determined, and the first key is updated to the second key. Similarly, before the fresh value of the second message is the second fresh value, the first vehicle-mounted device and the second vehicle-mounted device separately derive the fourth key. When the fresh value of the second message reaches the second fresh value, a quantity of update times of the third key is determined, and the third key is updated to the fourth key.

In Manner B, the first vehicle-mounted device and the second vehicle-mounted device may refer to Manner A2. To reduce an operation amount used for the first vehicle-mounted device and the second vehicle-mounted device to derive a key, the first key, the updated second key, the third key, and the updated fourth key may also be preset by the first vehicle-mounted device and the second vehicle-mounted device. That is, the first vehicle-mounted device and the second vehicle-mounted device may pre-determine the second key and the fourth key that are updated each time, and pre-store the second key and the fourth key in the first vehicle-mounted device and the second vehicle-mounted device. When the fresh value of the first message reaches the first fresh value for the $N^{th}$ time, the first vehicle-mounted device and the second vehicle-mounted device determine the second key obtained after the $N^{th}$ update. When the fresh value of the second message reaches the second fresh value for the $M^{th}$ time, the fourth key obtained after the $M^{th}$ update is determined.

In Scenario 2, in some embodiments, when the vehicle is started or the vehicle is initialized, a stored key between the first vehicle-mounted device and the second vehicle-mounted device may be used as a first key (that is, a key updated for the $0^{th}$ time) before the first fresh value or the second fresh value is reached for the first time during data transmission between the first vehicle-mounted device and the second vehicle-mounted device. The key updated for the $0^{th}$ time may be a preset first key, or may be a first key generated for the first time when the vehicle is started. This is not limited herein.

Manner A: The first vehicle-mounted device may derive the second key based on a first key or a second key that is generated historically.

For a specific implementation, refer to Manner A in Scenario 1. Details are not described herein again.

In Manner A1, optionally, a scenario in which a time at which the fresh value of the first message reaches the first threshold and a time at which the fresh value of the second message reaches the second threshold may fall within a same time range is considered. For example, when the fresh value of the first message reaches the first threshold, and when the fresh value of the first message reaches the first fresh value, the fresh value of the second message also reaches the second threshold. In this case, there may be a plurality of solutions to generating the second key. The following uses Manner 1 and Manner 2 as examples for description.

Manner a1: The first vehicle-mounted device and the second vehicle-mounted device correspondingly calculate the second key based on a sequence in which the fresh value of the first message and the fresh value of the second message reach the corresponding threshold, and agree to select a latest second key as the updated second key.

For example, the first fresh value is 8 bits, and the initial value is set to 00000000. The first vehicle-mounted device first determines that the fresh value of the first message will reach the first fresh value, and determines, by using the key derivation algorithm, a second key obtained after the first update. Then, the first vehicle-mounted device determines that the fresh value of the second message will also reach the second fresh value, and determines, by using the key derivation algorithm, the second key obtained after the second update. In this scenario, when the first fresh value of the first message sent by the first vehicle-mounted device to the second vehicle-mounted device is 00000000, a second key used by the first message that is sent by the first vehicle-mounted device to the second vehicle-mounted device is the second key obtained after the second update.

Manner a2: To avoid a case in which the first vehicle-mounted device and the second vehicle-mounted device need to generate the second key twice in a short time, it may be set that the second key is generated only once. To be specific, when the first vehicle-mounted device determines that the fresh value of the first message reaches the first threshold and the fresh value of the second message does not reach the first fresh value, and the fresh value of the second message reaches the second threshold, the step of deriving the second key is performed only once, that is, the second key is determined once. Alternatively, when the first vehicle-mounted device determines that the fresh value of the second message reaches the second threshold and the fresh value of the second message does not reach the second fresh value, the fresh value of the first message reaches the first threshold, and the step of deriving the second key is performed only once, that is, the second key is determined once.

According to the foregoing method, the first vehicle-mounted device and the second vehicle-mounted device need to generate an updated second key by using the key derivation algorithm when determining that the fresh value of the first message will reach the first fresh value or the fresh value of the second message will reach the second fresh value, to ensure that a second key updated each time is different.

Optionally, after determining that the second message from the second vehicle-mounted device is successfully decrypted by using the second key, the first vehicle-mounted device may delete the first key. After the first vehicle-mounted device deletes the first key, the first vehicle-mounted device may encrypt the data based on the currently used second key as the first key when the fresh value of the first message does not reach the next first fresh value, and until the fresh value of the next first message reaches the first fresh value, then perform the step of encrypting the first data by using the next updated second key to generate the first message. Alternatively, the first vehicle-mounted device may decrypt the encrypted second data in the received second message based on the currently used second key as the first key when the fresh value of the second message does not reach the next second fresh value, and until the fresh value of the next second message reaches the second fresh value, then perform the step of decrypting the second data by using the updated second key, to reduce overheads of the first vehicle-mounted device.

Correspondingly, after determining that the first message from the first vehicle-mounted device is successfully decrypted by using the second key, the second vehicle-mounted device may delete the first key. After the second vehicle-mounted device deletes the first key, the second vehicle-mounted device may encrypt the data based on the currently used second key as the first key when the fresh value of the second message does not reach the next second fresh value, and until the fresh value of the next second message reaches the second fresh value, then perform the step of encrypting the second data by using the next updated second key to generate the second message. Alternatively, the second vehicle-mounted device may decrypt the encrypted first data in the received first message based on the currently used second key as the first key when the fresh value of the first message does not reach the next first fresh value, and until the fresh value of the next first message reaches the first fresh value, then perform the step of decrypting the first data in the first message by using the updated second key, to reduce overheads of the second vehicle-mounted device.

In Manner B of Scenario 2, the first vehicle-mounted device may determine a key update manner based on the quantity of update times of the second key, and generate an updated key.

For example, each time a second key is generated, the first parameter in the used key derivation function is related to the quantity of update times of the second key.

In some embodiments, when the fresh value of the first message is the first fresh value, the quantity of update times of the second key is determined, and the second key is generated. When the fresh value of the second message is the second fresh value, the quantity of update times of the second key is determined, and the second key is generated. After a fresh value of an $N^{th}$ first message is the first fresh value and a fresh value of an $M^{th}$ second message is the second fresh value, a current key is a key obtained after the $(N+M)^{th}$ update, where N and M are positive integers, and N and M are not both 0.

For example, before the second vehicle-mounted device receives the first message, the fresh value of the first message locally stored in the second vehicle-mounted device is 11111111, and the quantity of update times of second key is 4. In this case, if the first fresh value 00000000 carried in the first message is received, it may be determined that the second key needs to be generated. Therefore, the quantity of update times of the locally stored second key is updated to 5, and it is determined that the second key is a second key obtained after the fifth update.

In some embodiments, a second key updated each time may be generated based on a second key updated last time, or may be generated based on the initial key and at least one second key updated historically. For example, an operation is performed on the initial key, at least one second key updated before first N+M−1 times, and the first parameter by using the key derivation algorithm, to generate a second key obtained after the $(N+M)^{th}$ update. For the first parameter, refer to the implementation in Manner A. The first parameter may further include the quantity of update times of the second key. This is not limited herein. The initial key is a key determined by the first vehicle-mounted device and the second vehicle-mounted device during initialization, or may be a key written by the first vehicle-mounted device and the second vehicle-mounted device into firmware. It may also be understood that input of the key derivation algorithm includes the initial key, the at least one key updated before first N+M−1 times, the quantity of update times of the second key, and the first parameter, and the second key obtained after the $(N+M)^{th}$ update is output.

Optionally, a scenario in which a time at which the fresh value of the first message reaches the first fresh value and a time at which the fresh value of the second message reaches the second fresh value fall within a same time range is considered. The following uses Manner b1 and Manner b2 as examples for description.

Manner b1: The first vehicle-mounted device and the second vehicle-mounted device determine the second key based on a sequence in which the fresh value of the first message reaches the first fresh value and the fresh value of the second message reaches the second fresh value, and agree to select a latest second key as the updated second key. It is assumed that the fresh value of the first message reaches the first fresh value for the $(i-1)^{th}$ time, and the fresh value of the second message reaches the second fresh value for the $(j-1)^{th}$ time (i and j are positive integers greater than 1). For example, the fresh value of the first message reaches the first fresh value first. The second key obtained after the $(i+j-1)^{th}$ update is determined when the fresh value of the first message reaches the first fresh value, and the second key obtained after the $(i+j)^{th}$ update is determined when the fresh value of the second message reaches the second fresh value. When a fresh value of an $i^{th}$ first message reaches the first fresh value, the first vehicle-mounted device encrypts the first data by using the second key obtained after the $(i+j-1)^{th}$ update, and sends the first message (the encrypted first data and the first fresh value) to the second vehicle-mounted device. The second vehicle-mounted device decrypts the first data by using the second key obtained after the $(i+j-1)^{th}$ update. When a fresh value of a $j^{th}$ second message reaches the second fresh value, the second vehicle-mounted device encrypts the second data by using the second key obtained after the $(i+j)^{th}$ update, and sends the second message (the encrypted second data and the second fresh value) to the first vehicle-mounted device. The first vehicle-mounted device decrypts the second data in the second message by using the second key obtained after the $(i+j)^{th}$ update.

Manner b2: It may be set that the second key is generated only once. With reference to the foregoing example, when the first vehicle-mounted device or the second vehicle-mounted device determines that a moment at which the fresh value of the $i^{th}$ first message reaches the first fresh value and a moment at which the fresh value of the $j^{th}$ second message reaches the second fresh value are within a preset duration range, the second key obtained after the $(i+j)^{th}$ update used by the first vehicle-mounted device or the second vehicle-mounted device is the same as the second key obtained after the $(i+j-1)^{th}$ update.

Optionally, after determining that the second key obtained after the $(N+M)^{th}$ update is successively decrypted, the first vehicle-mounted device and the second vehicle-mounted device may delete the second key obtained after the $(N+M-1)^{th}$ update. Then, the first vehicle-mounted device and the second vehicle-mounted device may use the second key obtained after the $(N+M)^{th}$ update as the first key to encrypt sent data, and use the second key obtained after the $(N+M)^{th}$ update as the first key to decrypt received data, to reduce occupation of storage space.

It should be noted that, refer to Manner B in Scenario 1, the second key may be separately derived by the first vehicle-mounted device and the second vehicle-mounted device before the fresh value of the first message reaches the first fresh value. Alternatively, the second key may be separately derived by the first vehicle-mounted device and the second vehicle-mounted device before the fresh value of the second message reaches the second fresh value. Alternatively, to reduce an operation amount used for the first vehicle-mounted device and the second vehicle-mounted device to derive the second key, the second key may be preset by the first vehicle-mounted device and the second vehicle-mounted device. That is, the first vehicle-mounted device and the second vehicle-mounted device may predetermine a second key updated each time, and pre-store the second key in the first vehicle-mounted device and the second vehicle-mounted device. For example, when the fresh value of the first message reaches the first fresh value for the $N^{th}$ time, and the fresh value of the second message has appeared for M times, the first vehicle-mounted device determines to encrypt the first data by using the second key obtained after the $(N+M)^{th}$ update, to obtain the encrypted first data.

This present disclosure provides a data transmission method. The method may be applied to the communication system shown in FIG. 1. It may be that a first device sends encrypted data to a second device, and the second device decrypts the encrypted data sent by the first device. The first device may be a vehicle-mounted device, a roadside device, a network side device, or the like in a vehicle. Alternatively, the first device may be a chip of a first vehicle-mounted device, a roadside device, or a network side device. Alternatively, the first device may be a function or module that can implement data transmission between the vehicle and another device. For example, when the method is applied to in-vehicle communication, the first device and the second device may be vehicle-mounted devices in a same vehicle. When the method is applied to vehicle-to-vehicle communication, the first device and the second device may be vehicle-mounted devices of different vehicles. When the method is applied to vehicle-to-vehicle communication, the first device may be a vehicle-mounted device in a vehicle, or may be a network side device. When the method is applied to communication between a vehicle and a roadside device, the first device may be a vehicle-mounted device in the vehicle, or may be the roadside device. When the method is applied to communication between a roadside device and a roadside device or between a roadside device and a network side device, the first device may be the roadside device or the network side device in a vehicle. The following describes by using an example in which the first device is a first vehicle-mounted device and the second device is a second vehicle-mounted device. FIG. 2 is a schematic flowchart of a data transmission method according this present disclosure. The method includes the following steps.

Step 201: When determining that a fresh value of a message to be sent is a first fresh value, the first vehicle-mounted device generates a keystream based on the first fresh value and a second key.

The fresh value may be a fresh value of a first message sent by the first vehicle-mounted device to the second vehicle-mounted device.

Before step 201, the first vehicle-mounted device generates the keystream by using a fresh value and a first key that are corresponding to a message sent each time. The second key is an updated key, and is different from the first key.

The first fresh value is a preset specific fresh value that can trigger a key update.

In some embodiments, the first vehicle-mounted device may generate a keystream based on the first fresh value and a key. An operation for generating the keystream may be based on an encryption algorithm, or may be based on a KDF. It may also be understood that the first vehicle-mounted device may perform an operation on the key that is input into the KDF and the first fresh value, and output the keystream. Alternatively, the first vehicle-mounted device may perform an operation on the key that is input into the encryption algorithm and the first fresh value, and output the key stream.

Step 202: The first vehicle-mounted device encrypts first data based on the keystream, to obtain the encrypted first data.

Figures 3A, 3B:
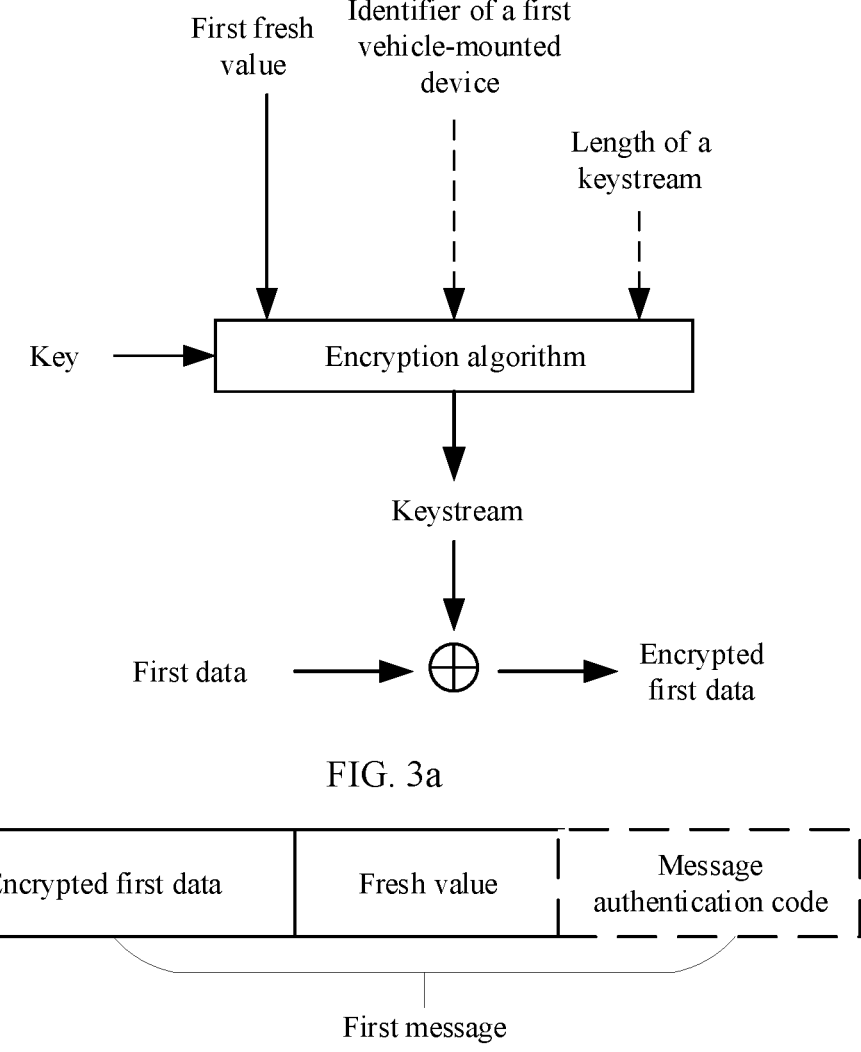
FIG. 3a and FIG. 3b are schematic diagrams of encryption according to an embodiment.

In a possible implementation, refer to FIG. 3a. First data of a keystream $\oplus$ may be used to obtain the encrypted first data. In some embodiments, the input for generating the keystream may further include at least one of the following: a length of the keystream, an identifier of the to-be-transmitted first data, an identifier of the first vehicle-mounted device, an identifier of the second vehicle-mounted device, and the like. It should be understood that, the length of the keystream may also be a default length of the first vehicle-mounted device. In this way, an exclusive OR operation is performed on the keystream and the first data, to generate the encrypted first data.

It should be noted that the second key may be determined before it is determined that the fresh value of the first message is the first fresh value, or may be pre-stored in the first vehicle-mounted device. Details are not described herein again. In Scenario 2, the first key used by the first vehicle-mounted device is different from a third key of the second vehicle-mounted device. In Scenario 2, the first key used by the first vehicle-mounted device is a shared key, and is the same as the third key of the second vehicle-mounted device.

Step 203: The first vehicle-mounted device generates the first message based on the encrypted first data and the first fresh value.

Refer to FIG. 3b. The first message may include the encrypted first data and the first fresh value.

Optionally, to slow down a fresh value reset speed, in this present disclosure, the first vehicle-mounted device and the second vehicle-mounted device may separately maintain an extended fresh value, for example, increase a high-order bit of the fresh value, and transmit only a low-order bit of the fresh value in a message transmission process. In other words, an actually transmitted fresh value may be a bit value on a preset quantity of bits of the fresh value, and the preset quantity of bits are a preset quantity of bits from a low-order bit to a high-order bit in the first fresh value. In this way, when it is ensured that a bit occupied by the transmitted fresh value remains unchanged, resetting of the fresh value is delayed.

Optionally, the first message may further include a message authentication code (MAC). The message authentication code may be generated by the first vehicle-mounted device based on the second key. After receiving the first message, the second vehicle-mounted device may further determine the second key based on the first fresh value of the first message. The second vehicle-mounted device calculates a MAC based on the second key. The second vehicle-mounted device compares the MAC in the first message with the MAC calculated based on the second key of the first message. If the comparison succeeds, the second vehicle-mounted device considers that the first message is reliable, that is, the first message is not tampered with.

It should be noted that, to further improve security of data transmitted by the first vehicle-mounted device, a key used for encryption and a key used for integrity protection may be different keys. For example, it can be implemented by inputting different parameters (for example, an algorithm type parameter (algorithm type distinguisher)). For example, a parameter for generating a key of encrypted data is a first parameter, a parameter for generating a key for integrity protection is a second parameter, and the first parameter and the second parameter are different. For example, the first parameter may be "0x01", and the second parameter may be "0x02". For another example, the first parameter is "encryption", and the second parameter is "integrity". In addition, the first parameter and a key derivation algorithm may be agreed on by the first vehicle-mounted device and the second vehicle-mounted device.

Step 204: The first vehicle-mounted device sends the first message to the second vehicle-mounted device.

The first message may include the encrypted first data and the first fresh value. The first fresh value of the first message may be sent in plaintext. Correspondingly, the second vehicle-mounted device may receive the encrypted first data and the first fresh value from the first vehicle-mounted device.

Step 205: The second vehicle-mounted device determines, based on a fact that the fresh value of the first message is the first fresh value, that a key corresponding to the first message is the second key.

In some embodiments, when the second vehicle-mounted device determines that the key corresponding to the first message is the second key, the second vehicle-mounted device may update the first key to the second key.

In some embodiments, when determining that a locally stored first fresh value is different from the first fresh value of the received first message, and the fresh value of the first message is the first fresh value, the second vehicle-mounted device may determine that the first message is not a replay message, that is, confirm that the first message is secure. In addition, the second vehicle-mounted device may determine that the key corresponding to the first message is the second key. With reference to Scenario 1 and Scenario 2, the following briefly describes corresponding second keys in different scenarios.

In Manner A of Scenario 1, before receiving the first message, when determining that the fresh value of the first message will reach the first fresh value, the second vehicle-mounted device may determine an updated second key by using the key derivation algorithm.

In Manner B of Scenario 1, it is assumed that the second key has been updated N−1 times before the first message is sent. In this case, after receiving the first message, when determining that the fresh value of the first message is the first fresh value, the second vehicle-mounted device may determine that the key corresponding to the first message is a second key obtained after the $N^{th}$ update.

In Manner A of Scenario 2, before receiving the first message, when determining that the fresh value of the first message will reach the first fresh value, the second vehicle-mounted device may determine the second key based on a currently used first key by using the key derivation algorithm.

In Manner B of Scenario 2, an example in which the quantity of update times of the second key locally stored in the second vehicle-mounted device is N+M−1 is used. In this case, the second vehicle-mounted device receives the first message, and when determining that the fresh value of the first message is the first fresh value, the second vehicle-mounted device accumulates the quantity of update times of the second key locally stored, and determines that the second key is the second key obtained after the $(N+M)^{th}$ update.

Step 206: Decrypt the first message based on a decryption key corresponding to the second key and the first fresh value, to obtain the first data.

Specifically, the second vehicle-mounted device may decrypt the first message based on the decryption key corresponding to the second key and the first fresh value, to obtain the first data. In a possible manner, the second vehicle-mounted device performs an operation based on the decryption key corresponding to the second key and the first fresh value, to generate the keystream. The second vehicle-mounted device performs an exclusive OR operation on the keystream and the encrypted first data, to obtain the first data. For this step, reference may be made to a manner in which the first vehicle-mounted device performs an operation based on the second key and the first fresh value to generate the keystream in step 202. Details are not described herein again.

It can be learned from step 201 to step 206 that the first vehicle-mounted device may determine, based on whether the fresh value of the first message is the first fresh value, whether the second key needs to be used to encrypt the sent first data. Correspondingly, the second vehicle-mounted device may determine, based on whether the fresh value of the first message is the first fresh value, whether the second key needs to be used to decrypt the sent encrypted first data. In this way, when sending data, the first vehicle-mounted device and the second vehicle-mounted device correspondingly update a key when a fresh value reaches a specific value. This avoids a problem that security is reduced because an original key is used and an extra delay is generated because the data is sent after the two parties confirm that the key is updated.

Example 1

Figure 4A:
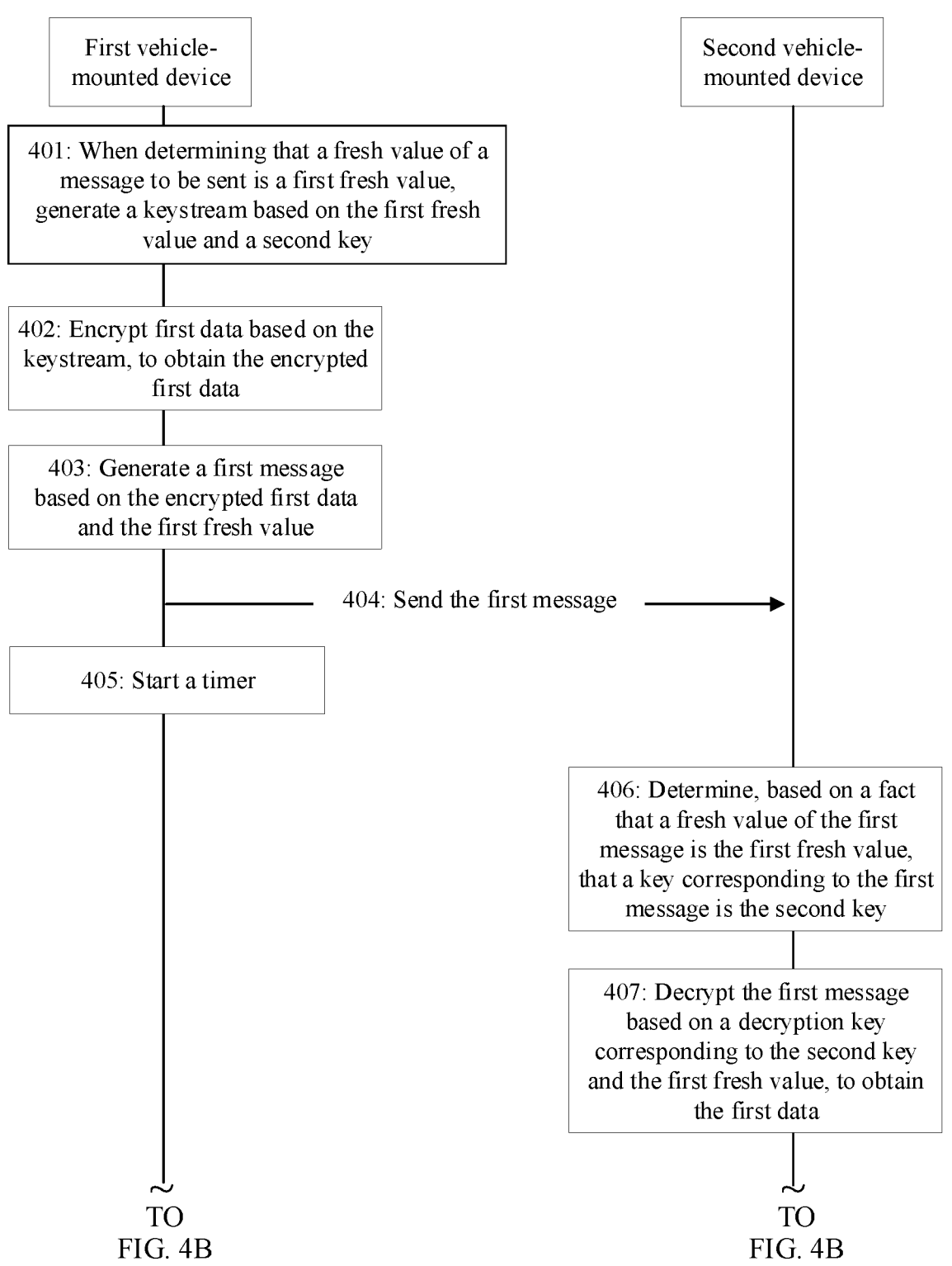
FIG. 4A and FIG. 4B are a schematic flowchart of a data transmission method according to an embodiment.
Figure 4B:
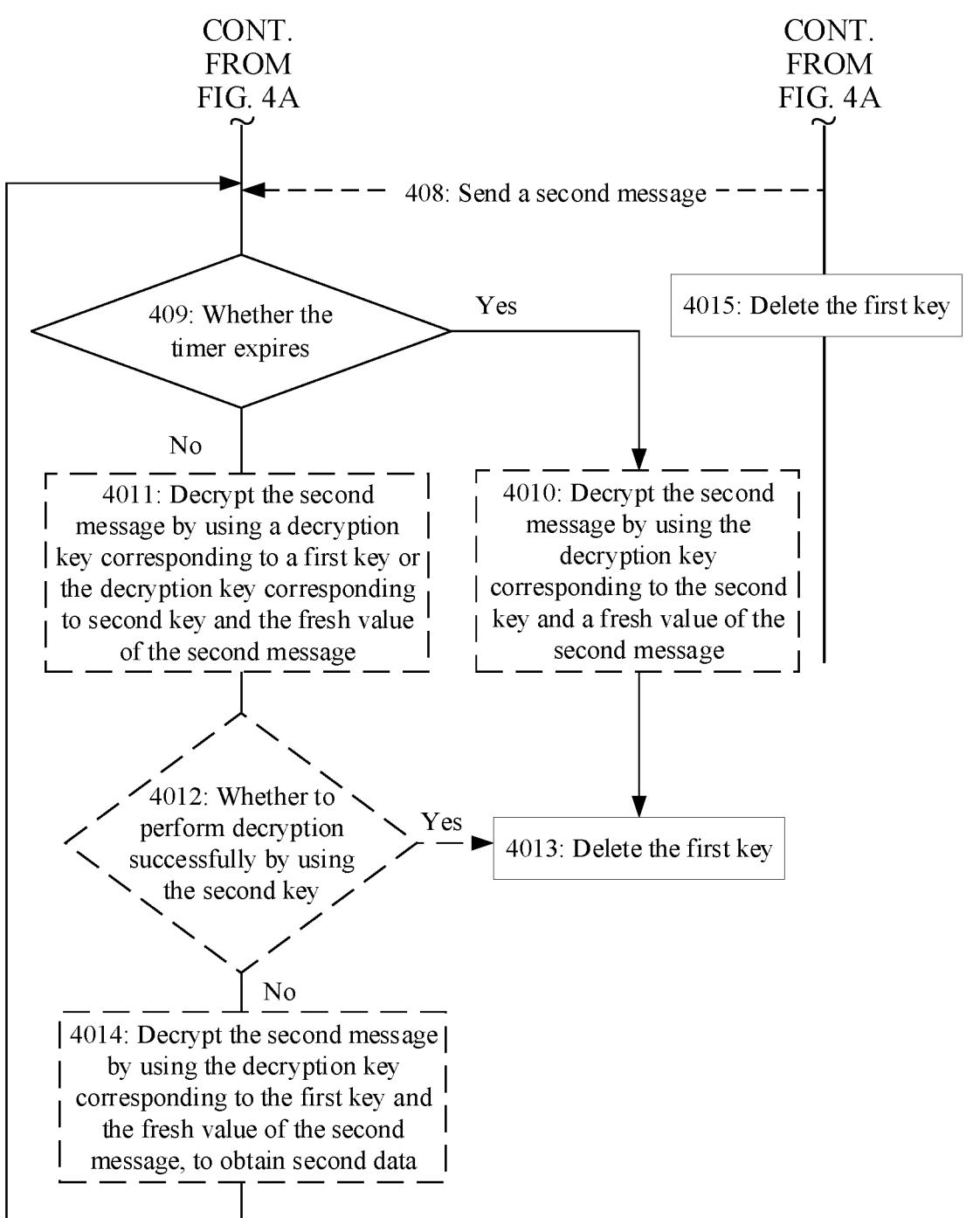

Considering that a scenario like a delay or packet loss may exist during data transmission between the first vehicle-mounted device and the second vehicle-mounted device, that the first vehicle-mounted device and the second vehicle-mounted device perform accurate decryption needs to be ensured while transmitting data, to reduce a data transmission delay. For example, the first vehicle-mounted device and the second vehicle-mounted device are in Scenario 2. For the first vehicle-mounted device and the second vehicle-mounted device in Scenario 1, refer to this embodiment. Details are not described herein again. With reference to FIG. 2, an embodiment of this present disclosure further provides a data transmission method. As shown in FIG. 4A and FIG. 4B, the method may include the following steps.

Step 401: When determining that a fresh value of a message to be sent is a first fresh value, the first vehicle-mounted device generates a keystream based on the first fresh value and a second key.

Step 402: The first vehicle-mounted device encrypts first data based on the keystream, to obtain the encrypted first data.

Step 403: The first vehicle-mounted device generates a first message based on the encrypted first data and the first fresh value.

Step 404: The first vehicle-mounted device sends the first message to the second vehicle-mounted device.

Step 405: After sending the first message to the second vehicle-mounted device, the first vehicle-mounted device starts a timer.

Considering that the second vehicle-mounted device may not send data to the first vehicle-mounted device for a long time, in this case, the first vehicle-mounted device may set a timer after sending the first message, and delete a first key (or may be represented as a key obtained after the $(N+M−1)^{th}$ update) when first preset duration expires. The first preset duration may be determined based on a time for data transmission between the first vehicle-mounted device and the second vehicle-mounted device. For example, the first preset duration may be a time for transmitting 1.5 data packets between the first vehicle-mounted device and the second vehicle-mounted device. It should be noted that step 405 is an optional step.

Step 406: The second vehicle-mounted device determines, based on a fact that a fresh value of the first message is the first fresh value, that a key corresponding to the first message is the second key.

Step 407: Decrypt the first message based on a decryption key corresponding to the second key and the first fresh value, to obtain the first data.

For step 401 to step 404 and step 406 and step 407, refer to the implementations of step 201 to step 206. Details are not described herein again.

Step 408: The second vehicle-mounted device sends a second message to the first vehicle-mounted device.

The second message may include encrypted second data of the second vehicle-mounted device and a fresh value of the second message.

It should be noted that, considering that a packet loss or a delay may occur during transmission of the first message and the second message, step 408 may occur after the second vehicle-mounted device successfully receives the first message. In this case, the second data in the second message is encrypted based on the second key. In another possible case, step 402 may also occur before the second vehicle-mounted device successfully receives the first message. In this case, the second data in the second message is encrypted based on the first key. The following provides descriptions by using specific scenarios as examples.

In Manner A of Scenario 2, in some embodiments, step 408 may be sent by the second vehicle-mounted device after the first message is successfully received. In this case, when the second vehicle-mounted device has determined that the fresh value of the first message is the first fresh value, and determines that the fresh value of the second message does not reach the second fresh value, the second vehicle-mounted device encrypts the second data by using the second key. For a specific manner of determining the second key, refer to Manner A in Scenario 2. Details are not described herein again. In some embodiments, step 408 may be sent before the second vehicle-mounted device receives the first message, or the second vehicle-mounted device fails to receive the first message. In this case, the fresh value of the first message historically stored in the second vehicle-mounted device does not reach the first fresh value, and the second vehicle-mounted device determines, based on the fresh value of the second message, that the fresh value of the second message does not reach the second fresh value. Therefore, the second vehicle-mounted device encrypts the second data by using the first key. Therefore, the first vehicle-mounted device determines, based on the fresh value of the received second message, that the second vehicle-mounted device updates the key at most once or does not update the key. Therefore, the second message may be decrypted based on the first key or the second key. In another possible scenario, in step 408, when the second vehicle-mounted device has determined that the fresh value of the first message is the first fresh value, and when determining that the fresh value of the second message is the second fresh value, the second vehicle-mounted device encrypts the second data by using a third key. Correspondingly, when the fresh value of the first message that is not received by the second vehicle-mounted device is the first fresh value, and it is determined that the fresh value of the second message is the second fresh value, the second vehicle-mounted device encrypts the second data by using the second key. Therefore, the first vehicle-mounted device determines, based on the second fresh value of the received second message, that the second vehicle-mounted device updates the key at least once. Therefore, the second message may be decrypted based on the second key or the third key.

In Manner B of Scenario 2, an example in which the quantity of update times of the second key locally stored in the second vehicle-mounted device is N+M−1 is used.

In some embodiments, step 408 may be sent before the second vehicle-mounted device receives the first message, and the fresh value of the second message does not reach the second fresh value. The second vehicle-mounted device encrypts the second data by using the second key obtained after the $(N+M-1)^{th}$ update.

In some embodiments, in step 408, the second vehicle-mounted device fails to receive the first message, and the fresh value of the second message does not reach the second fresh value. Therefore, the second vehicle-mounted device encrypts the second data by using the second key obtained after the $(N+M-1)^{th}$ update.

In some embodiments, in step 408, the second vehicle-mounted device successfully receives the first message, and the fresh value of the second message does not reach the second fresh value. When determining that the fresh value of the first message is the first fresh value, the second vehicle-mounted device accumulates the quantity of update times of the second key locally stored, and determines that the second key is the second key obtained after the $(N+M)^{th}$ update.

In some embodiments, in step 408, the second vehicle-mounted device fails to receive the first message, and the fresh value of the second message reaches the second fresh value. Therefore, the second vehicle-mounted device encrypts the second data by using the second key obtained after the $(N+M)^{th}$ update.

In some embodiments, in step 408, the second vehicle-mounted device successfully receives the first message, and the fresh value of the second message reaches the second fresh value. Therefore, the second vehicle-mounted device encrypts the second data by using the second key obtained after the $(N+M+1)^{th}$ update.

In Manner A of Scenario 1, before sending the second message, when determining that the fresh value of the second message is the second fresh value, the second vehicle-mounted device determines to encrypt the second data by using the fourth key. When it is determined that the fresh value of the second message does not reach the second fresh value, the second data may be encrypted based on the currently used third key.

In Manner B of Scenario 1, it is assumed that the fourth key has been updated M−1 times before the second vehicle-mounted device sends the second message to the first vehicle-mounted device. In this case, if the second vehicle-mounted device determines that the fresh value of the second message is the second fresh value, a key corresponding to the second message is the fourth key obtained after the $M^{th}$ update. When the second vehicle-mounted device determines that the fresh value of the second message does not reach the second fresh value, the key corresponding to the second message is a fourth key (that is, the third key) obtained after the $(M-1)^{th}$ update.

Based on the foregoing different scenarios, the first vehicle-mounted device cannot determine whether the key used in the second message is updated to the second key based on the first message, or the first key is still used. In this case, the first vehicle-mounted device may determine, based on whether the timer expires, to decrypt the second message by using the first key or the second key. Optionally, to improve a success rate of decrypting, the first vehicle-mounted device may decrypt encrypted data in the second message by using the first key when a priority timer does not expire, or the first vehicle-mounted device may decrypt encrypted data in the second message by using the second key when a priority timer does not expire, that is, step 4011 is performed. After the priority timer expires, the encrypted data in the second message is decrypted by using the second key. The following uses this manner for description, that is, step 4010 is performed. Optionally, the first vehicle-mounted device may also preferentially decrypt the encrypted data in the second message based on the second key when no expiration occurs, or the first vehicle-mounted device may preferentially decrypt the encrypted data in the second message based on the first key when no expiration occurs. For this manner, refer to this embodiment. Details are not described herein again.

Step 409: The first vehicle-mounted device determines whether the timer expires, and if yes, performs step 4011; or if no, performs step 4010.

Specifically, the first vehicle-mounted device determines whether the timer exceeds first preset duration, and determines whether the timer expires.

Step 4010: The first vehicle-mounted device decrypts the second message by using the decryption key corresponding to the second key.

For a specific decryption manner, refer to the step (for example, step 205) in which the second vehicle-mounted device decrypts the first message based on the decryption key corresponding to the second key. Details are not described herein again.

Step 4011: The first vehicle-mounted device decrypts the second message by using the decryption key corresponding to the second key or a decryption key corresponding to the first key and the fresh value of the second message.

Step 4012: The first vehicle-mounted device determines whether the second message is successfully decrypted; and if yes, performs step 4013; or if no, performs step 4014.

Step 4013: The first vehicle-mounted device deletes the first key.

Step 4014: The first vehicle-mounted device decrypts the second message based on the decryption key corresponding to the first key.

After the decryption fails, the first vehicle-mounted device may decrypt data in the second message based on the decryption key corresponding to the first key. A reason why the decryption fails may be that the second vehicle-mounted device does not use the second key. In this case, the first vehicle-mounted device may decrypt the data in the second message based on the decryption key corresponding to the first key. When the first vehicle-mounted device may successfully decrypt the data in the second message based on the decryption key corresponding to the first key, the first vehicle-mounted device may determine that the second vehicle-mounted device does not use the second key. In this case, the first vehicle-mounted device may reserve the first key.

Optionally, in step 4015, the second vehicle-mounted device may delete the locally stored first key.

It should be noted that step 4015 may be performed immediately after step 407. An execution sequence between step 4015 and step 408 to step 4014 is not limited in this present disclosure.

Optionally, after deleting the first key, the first vehicle-mounted device may reset the timer until a first fresh value of a next first message is the first fresh value, and after step 404 is performed, the timer is restarted.

It should be noted that, when the timer does not expire, the encrypted data in the second message may be decrypted preferentially based on the decryption key corresponding to the second key. That is, in step 4011, the first vehicle-mounted device decrypts the second message based on the decryption key corresponding to the first key. After the decryption succeeds, it is determined that the second vehicle-mounted device does not update the first key, and the first key may be retained. After the decryption fails, the first vehicle-mounted device may decrypt the data in the second message based on the decryption key corresponding to the second key. For a specific implementation process, refer to step 409 to step 4014. Details are not described herein again.

Example 2

Figure 5:
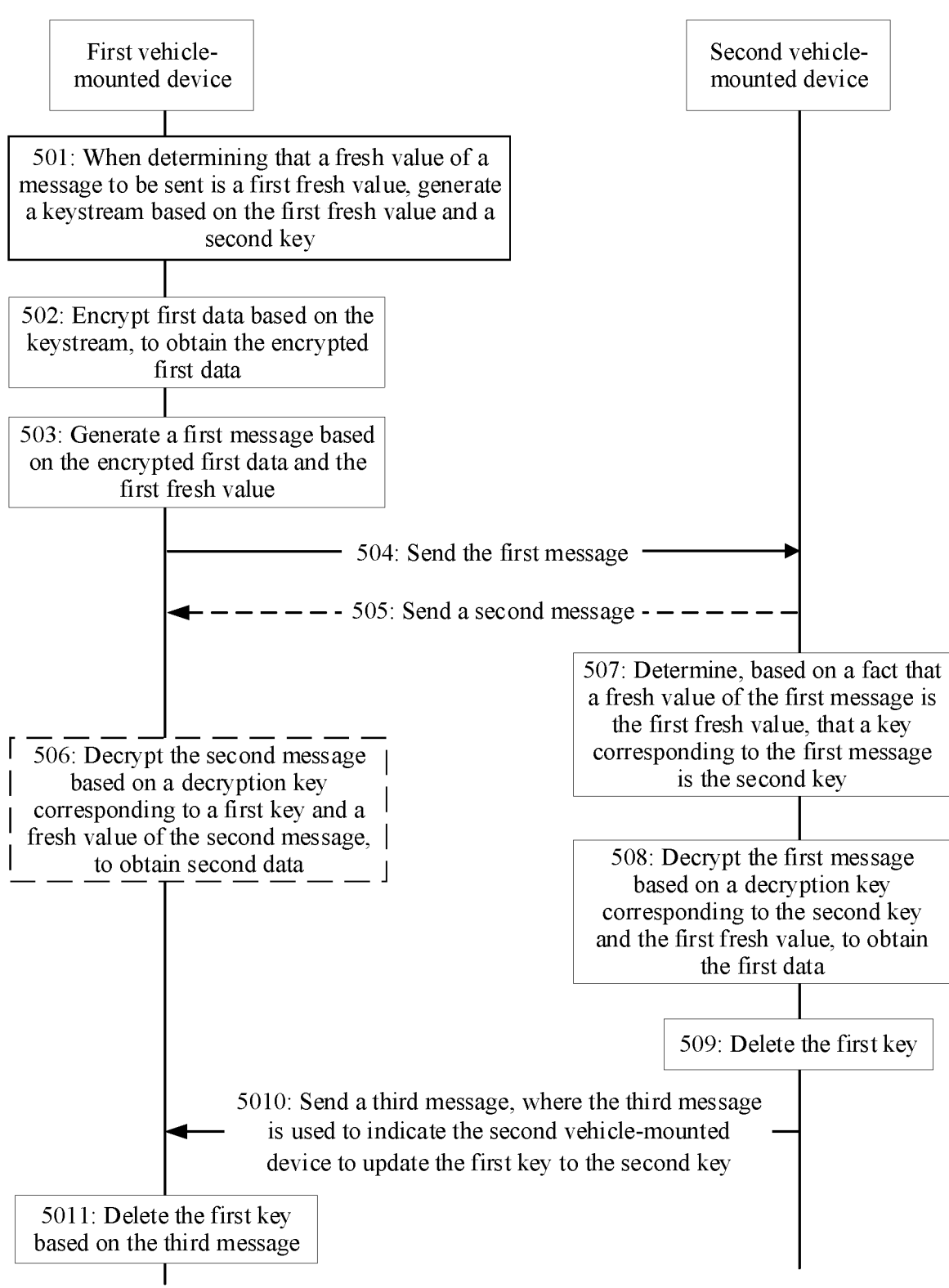
FIG. 5 is a schematic flowchart of a data transmission method according to an embodiment.

Considering that a scenario like a delay or packet loss may exist during data transmission between the first vehicle-mounted device and the second vehicle-mounted device, that the first vehicle-mounted device and the second vehicle-mounted device perform accurate decryption needs to be ensured while transmitting data, to reduce a data transmission delay. For example, the first vehicle-mounted device and the second vehicle-mounted device are in Scenario 2. For the first vehicle-mounted device and the second vehicle-mounted device in Scenario 1, refer to this embodiment. Details are not described herein again. With reference to FIG. 2, an embodiment of this present disclosure further provides a data transmission method. As shown in FIG. 5, the method may include the following steps.

Step 501: When determining that a fresh value of a message to be sent is a first fresh value, the first vehicle-mounted device generates a keystream based on the first fresh value and a second key.

Step 502: The first vehicle-mounted device encrypts first data based on the keystream, to obtain the encrypted first data.

Step 503: The first vehicle-mounted device generates a first message based on the encrypted first data and the first fresh value.

Step 504: The first vehicle-mounted device sends the first message to the second vehicle-mounted device.

Step 505: The second vehicle-mounted device sends a second message to the first vehicle-mounted device.

The second message may include encrypted second data of the second vehicle-mounted device and a fresh value of the second message.

In Example 2, an example in which the fresh value of the second message does not reach a second fresh value is used for description.

Step 506: The first vehicle-mounted device decrypts the second message by using a decryption key corresponding to a first key.

Considering that the second vehicle-mounted device may not send data to the first vehicle-mounted device for a long time, step 505 and step 506 are optional steps. Therefore, in FIG. 5, dashed lines indicate that performing 505 and step 506 is optional.

Step 507: The second vehicle-mounted device determines, based on a fact that a fresh value of the first message is the first fresh value, that a key corresponding to the first message is the second key.

Step 508: Decrypt the first message based on a decryption key corresponding to the second key and the first fresh value, to obtain the first data.

For step 501 to step 504 and step 507 and step 508, refer to the implementations of step 201 to step 206. Details are not described herein again.

Step 509: The second vehicle-mounted device deletes the first key.

With reference to Manner A, after successfully decrypting the encrypted first data, the second vehicle-mounted device may update the currently used first key based on the second key. With reference to Manner B, the currently used first key is used as the second key obtained after the $(N+M-1)^{th}$ update, and after successfully decrypting the encrypted first data, the second vehicle-mounted device may update the currently used first key with the second key obtained after the $(N+M)^{th}$ update.

Step 5010: The second vehicle-mounted device sends a third message to the first vehicle-mounted device.

The third message is used to indicate the second vehicle-mounted device to update the first key to the second key.

Optionally, the third message may be further used to indicate the second device to delete a notification message of the first key.

Optionally, the third message may further include encrypted third data. In this case, the third data may be encrypted based on the second key and a fresh value of the third message. Therefore, after receiving the third data, the first vehicle-mounted device determines, based on a key corresponding to the third message as the second key, that the second vehicle-mounted device updates the first key to the second key.

Step 5011: The first vehicle-mounted device deletes the first key based on the third message.

With reference to step 5010, the first vehicle-mounted device may update the first key to the second key based on the second vehicle-mounted device indicated by the third message, and determine that the first key may be deleted.

In the foregoing manner, the first vehicle-mounted device can delete the first key in a timely manner without setting a timer, thereby improving transmission efficiency and a transmission effect of the first vehicle-mounted device and the second vehicle-mounted device.

Example 3

Considering that a scenario like a delay or packet loss may exist in data transmission between the first vehicle-mounted device and the second vehicle-mounted device, that the first vehicle-mounted device and the second vehicle-mounted device update a key need to be ensured while transmitting data, to reduce a data transmission delay.

Figure 6:
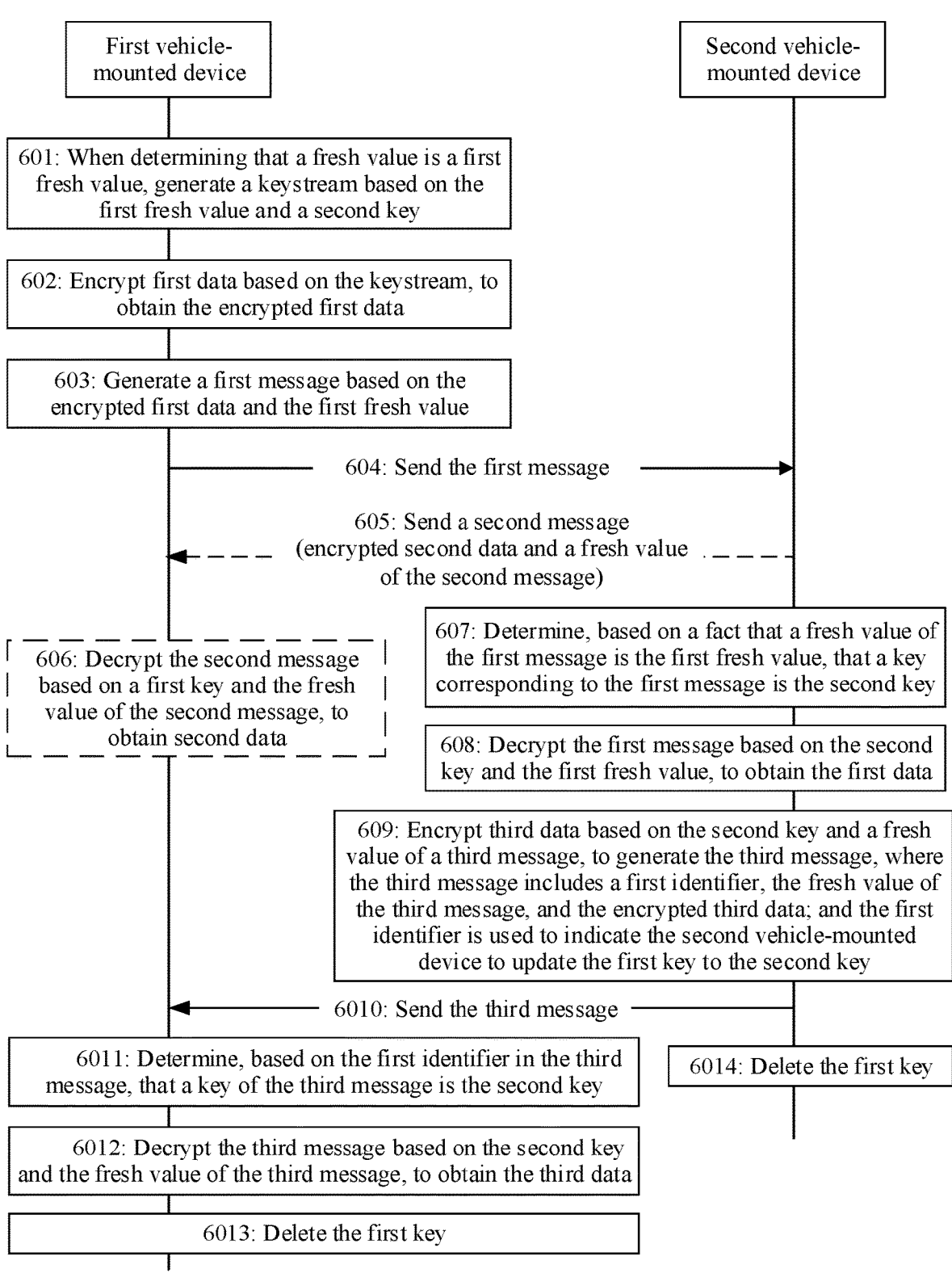
FIG. 6 is a schematic flowchart of a data transmission method according to an embodiment.

An example in which the first vehicle-mounted device and the second vehicle-mounted device are in Scenario 2 is used. With reference to FIG. 2, an embodiment of this present disclosure further provides a data transmission method. As shown in FIG. 6, the method may include the following steps.

Step 601: When determining that a fresh value of a message to be sent is a first fresh value, the first vehicle-mounted device generates a keystream based on the first fresh value and a second key.

Step 602: The first vehicle-mounted device encrypts first data based on the keystream, to obtain the encrypted first data.

Step 603: The first vehicle-mounted device generates a first message based on the encrypted first data and the first fresh value.

Step 604: The first vehicle-mounted device sends the first message to the second vehicle-mounted device.

Step 605: The second vehicle-mounted device sends a second message to the first vehicle-mounted device.

The second message may include encrypted second data of the second vehicle-mounted device and a fresh value of the second message.

In Example 3, an example in which a fresh value of the second message does not reach a second fresh value is used for description.

Step 606: The first vehicle-mounted device decrypts the second message by using a decryption key corresponding to a first key.

Considering that the second vehicle-mounted device may not send data to the first vehicle-mounted device for a long time, step 605 and step 606 are optional steps. Therefore, in FIG. 6, dashed lines indicate that performing 605 and step 606 is optional.

Step 607: The second vehicle-mounted device determines, based on a fact that a fresh value of the first message is the first fresh value, that a key corresponding to the first message is the second key.

Step 608: Decrypt the first message based on a decryption key corresponding to the second key and the first fresh value, to obtain the first data.

For step 501 to step 504 and step 507 and step 508, refer to the implementations of step 201 to step 206. Details are not described herein again.

Step 609: The second vehicle-mounted device generates a keystream based on the second key and a fresh value of a third message, and encrypts third data based on the keystream to generate the third message.

Considering a possible packet loss problem, to avoid a case in which the first vehicle-mounted device may not be able to determine, based on the fresh value of the third message, whether the second vehicle-mounted device is updated to the second key, in this example, the second vehicle-mounted device may include, in the third message, the encrypted third data of the second vehicle-mounted device, the fresh value of the third message, and a first identifier. The first identifier may be used to identify that the second vehicle-mounted device updates the first key to the second key.

Optionally, to avoid a case in which the first vehicle-mounted device may not be able to receive the third message that carries the first identifier due to a packet loss, the first identifier may be added to two or more third messages that are determined to have the key updated.

Step 6010: The second vehicle-mounted device sends the third message to the first vehicle-mounted device.

Correspondingly, the first vehicle-mounted device receives the third message sent by the second vehicle-mounted device.

Step 6011: The first vehicle-mounted device determines, based on the first identifier in the third message, that a key of the third message is the second key.

The first vehicle-mounted device may determine, based on the first identifier of the third message, that the key used for the encrypted third data in the third message is the second key.

Step 6012: The first vehicle-mounted device decrypts the third message based on the decryption key corresponding to the second key and the fresh value of the third message, to obtain the third data.

For a specific decryption process, refer to step 4010 or step 4014. Details are not described herein again.

Step 6013: The first vehicle-mounted device deletes the first key.

With reference to step 6012, the first vehicle-mounted device may update the first key to the second key based on the second vehicle-mounted device indicated by the third message, and determine that the first key may be deleted.

When the first vehicle-mounted device may successfully decrypt data in the third message based on the second key, the first vehicle-mounted device may determine that the second vehicle-mounted device has used the second key, so that the first vehicle-mounted device may delete the locally stored first key. In this example, the first vehicle-mounted device may determine, based on whether the third message or the second message sent by the second vehicle-mounted device carries the first identifier, whether the key in the second vehicle-mounted device is updated. Therefore, the first key needs to be deleted only after the third message carrying the first identifier is received, to avoid a manner of setting a timer to delete the first key, thereby improving system fault tolerance and reducing overheads.

Step 6014: The second vehicle-mounted device deletes the first key.

With reference to Manner A, after successfully decrypting the encrypted first data, the second vehicle-mounted device may update the currently used first key based on the second key. With reference to Manner B, the currently used first key is used as the second key obtained after the $(N+M-1)^{th}$ update, and after successfully decrypting the encrypted first data, the second vehicle-mounted device may update the currently used first key with the second key obtained after the $(N+M)^{th}$ update.

According to the foregoing method, the first vehicle-mounted device may determine, based on the first identifier in the third message, that the second vehicle-mounted device updates the first key to the second key, so that a situation in which the first vehicle-mounted device additionally determines whether an encryption key in the second message is the first key or the second key is reduced, thereby reducing power consumption and a delay.

Example 4

Figure 7A:
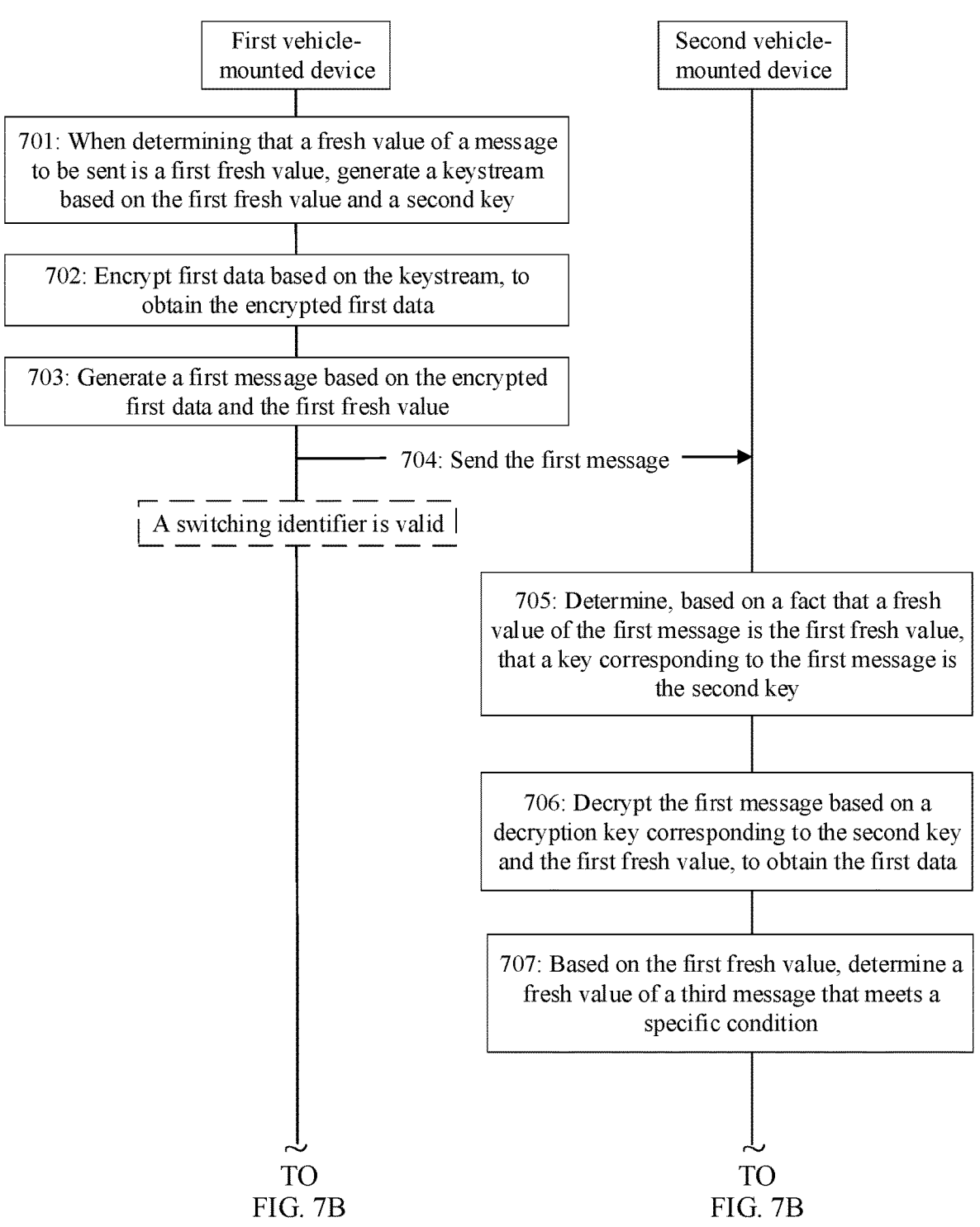
FIG. 7A and FIG. 7B are a schematic flowchart of a data transmission method according to an embodiment.
Figure 7B:
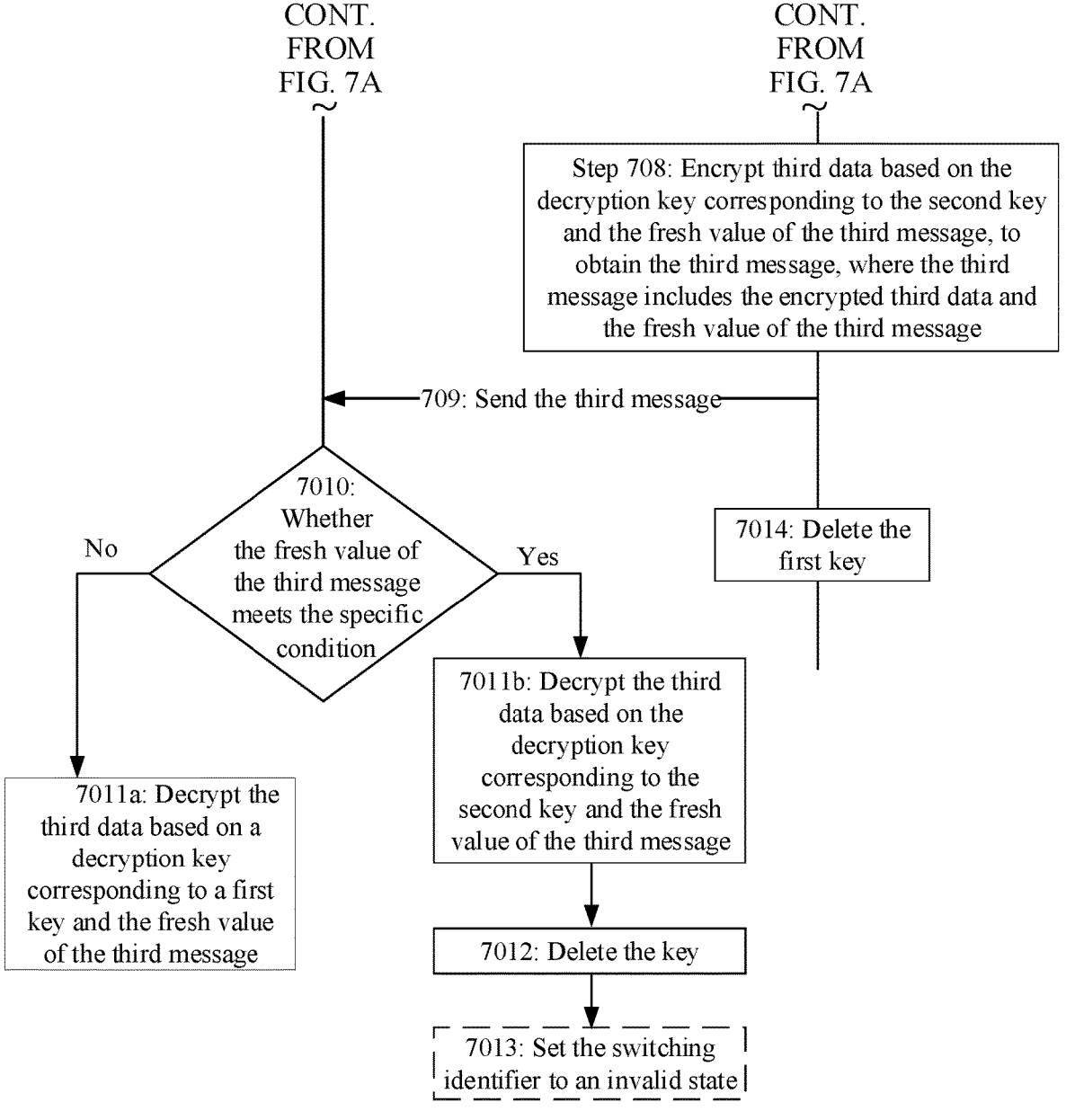

Considering that a scenario like a delay or packet loss may exist in data transmission between the first vehicle-mounted device and the second vehicle-mounted device, that the first vehicle-mounted device and the second vehicle-mounted device update a key needs to be ensured while transmitting data, to reduce a data transmission delay. For example, the first vehicle-mounted device and the second vehicle-mounted device are in Scenario 2. With reference to FIG. 2, after the first vehicle-mounted device sends the first message to the second vehicle-mounted device, an embodiment of this present disclosure further provides a data transmission method. As shown in FIG. 7A and FIG. 7B, the method may include the following steps.

Step 701: When determining that a fresh value of a message to be sent is a first fresh value, the first vehicle-mounted device generates a keystream based on the first fresh value and a second key.

Step 702: The first vehicle-mounted device encrypts first data based on the keystream, to obtain the encrypted first data.

Step 703: The first vehicle-mounted device generates the first message based on the encrypted first data and the first fresh value.

Step 704: The first vehicle-mounted device sends the first message to the second vehicle-mounted device.

Optionally, after sending the first message to the second vehicle-mounted device, the first vehicle-mounted device may set a switching identifier to a valid state. In FIG. 7A and FIG. 7B, a dashed line is used to indicate that the switching identifier is valid and is an optional step, and correspondingly, step 7013 is an optional step.

In some embodiments, the valid state of the switching identifier may be triggered after the first vehicle-mounted device sends the first message (in this case, the fresh value of the first message is the first fresh value), and the switching identifier is set to an invalid state after the first vehicle-mounted device successfully decrypts third data in a third message sent by the second vehicle-mounted device (in this case, the third data is encrypted by using the second key). According to the foregoing method, when determining that the switching identifier is the valid state, the first vehicle-mounted device may set a fresh value of the third message that meets a specific condition, to determine that the second vehicle-mounted device encrypts the third data in the third message by using the second key. In this way, when a key of the third message sent by the second vehicle-mounted device is determined based on the specific condition, a case in which the fresh value of the third message received by the first vehicle-mounted device may be mistaken as the fresh value of the third message that meets the specific condition due to a packet loss is also avoided, thereby effectively improving efficiency and accuracy of receiving the third message.

Step 705: The second vehicle-mounted device determines, based on a fact that a fresh value of the first message is the first fresh value, that a key corresponding to the first message is the second key.

Step 706: The first vehicle-mounted device decrypts the first message by using a decryption key corresponding to the first key, to obtain the first data.

For step 701 to step 706, refer to the implementations of step 201 to step 206. Details are not described herein again.

Step 707: Based on the first fresh value, determine the fresh value of the third message that meets the specific condition.

Step 708: The second vehicle-mounted device generates a keystream based on the second key and the fresh value of the third message, and encrypts the third data based on the keystream to generate the third message.

Considering a possible packet loss problem, to avoid a case in which the first vehicle-mounted device may not be able to determine, based on the fresh value of the third message, whether the second vehicle-mounted device is updated to the second key, in this example, the second vehicle-mounted device may set the fresh value of the third message to the fresh value of the third message that meets the specific condition. Therefore, the second vehicle-mounted device may include, in the third message, the encrypted third data of the second vehicle-mounted device and the fresh value of the third message that meets the specific condition.

In a possible implementation, the fresh value of the third message is a fresh value obtained after an interval specific value from a fresh value of a message sent by the second vehicle-mounted device to the first vehicle-mounted device last time.

For example, before the third message is sent, a fresh value that is of the message sent by the second vehicle-mounted device to the first vehicle-mounted device and that is stored by the second vehicle-mounted device and the first vehicle-mounted device is 1000001. In this case, the fresh value carried in the third message by the second vehicle-mounted device may be 1000006, that is, an interval specific value is 5, and a fresh value that is of a locally stored message sent by the second vehicle-mounted device to the first vehicle-mounted device is updated to 1000003. After receiving the third message, the second vehicle-mounted device is enabled to determine that the interval specific value between the fresh value of the third message and the fresh value of the locally stored message sent by the second vehicle-mounted device to the first vehicle-mounted device is 5, and may determine that the third data in the third message is encrypted by using the second key.

Step 709: The second vehicle-mounted device sends the third message to the first vehicle-mounted device.

Correspondingly, the first vehicle-mounted device receives the third message sent by the second vehicle-mounted device.

Step 7010: The first vehicle-mounted device determines whether the fresh value of the third message meets the specific condition, and if yes, performs step 7011b; or if no, performs step 7011a.

In some embodiments, the first vehicle-mounted device may compare a second fresh value of a second message with a fresh value of the locally stored message sent by the second vehicle-mounted device to the first vehicle-mounted device, to determine whether the specific condition is met.

For example, when it is determined that the fresh value of the third message meets the specific condition (the interval specific value between the fresh value of the third message and the fresh value of the locally stored message sent by the second vehicle-mounted device to the first vehicle-mounted device), it may be determined that the second vehicle-mounted device updates the first key to the second key. In addition, the third message is encrypted based on the second key.

With reference to a scenario in which the switching identifier is set to be valid, in this embodiment, that the first vehicle-mounted device determines that the fresh value of the third message meets the specific condition needs to include: an interval specific value between the fresh value of the third message and a fresh value of a locally stored third message and that the switching identifier is in the valid state.

When determining that the switching identifier is in the invalid state, the first vehicle-mounted device may compare the fresh value of the third message with the fresh value of the locally stored third message, and when determining that the interval specific value between the fresh value of the third message and the fresh value of the locally stored third message, the first vehicle-mounted device determines that a packet loss may occur before. In this case, the first vehicle-mounted device may determine, based on the second fresh value of the received second message, whether the second fresh value of the received second message is the second fresh value. When the first vehicle-mounted device determines that the fresh value of the third message does not reach the second fresh value, step 7011*a* is performed. When the first vehicle-mounted device determines that the fresh value of the third message is the second fresh value, step 7011*b* is performed.

Step 7011*a*: The first vehicle-mounted device decrypts the encrypted third data in the third message based on the decryption key corresponding to the first key and the fresh value of the third message.

For a specific decryption manner, refer to step 204. Details are not described herein again.

Step 7011*b*: The first vehicle-mounted device decrypts the third message based on a decryption key corresponding to the second key and the fresh value of the third message, to obtain the third data.

For a specific decryption process, refer to step 4010 or step 4014. Details are not described herein again.

Step 7012: The first vehicle-mounted device deletes the first key.

When the first vehicle-mounted device may successfully decrypt the data in the second message based on an updated key, the first vehicle-mounted device may determine that the second vehicle-mounted device has used the second key, so that the first vehicle-mounted device may delete the locally stored first key, and determine that the switching identifier is invalid in this case. In this example, the first vehicle-mounted device may determine, based on whether the fresh value carried in the third message sent by the second vehicle-mounted device meets the specific condition, whether the second vehicle-mounted device updates the first key to the second key. Therefore, the first key needs to be deleted only after the fresh value that carries the third message that meets the specific condition is received, thereby improving system fault tolerance and reducing overheads.

Optionally, in step 7013, the first vehicle-mounted device sets the switching identifier to the invalid state.

Step 7014: The second vehicle-mounted device deletes the first key.

By using the foregoing method, the first vehicle-mounted device is enabled to determine a key used in the second message without increasing overheads of an additional identifier in the second message. This reduces a data transmission delay, and improves data transmission reliability.

It should be noted that, names of the foregoing information are merely examples. With evolution of communication technologies, the name of any foregoing information may be changed. However, regardless of how the names of the information change, provided that meanings of the information are the same as those of the information in this present disclosure, the information falls within the protection scope of this present disclosure.

The foregoing mainly describes the solutions provided in this present disclosure from a perspective of interaction between the vehicle-mounted devices. It may be understood that, to implement the foregoing functions, the foregoing vehicle-mounted devices include corresponding hardware structures and/or software modules for executing functions. A person of ordinary skill in the art should easily be aware that, in combination with the examples described in embodiments disclosed in this specification, units and algorithm steps may be implemented by hardware or a combination of hardware and computer software in the present disclosure. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the present disclosure.

Figure 8:
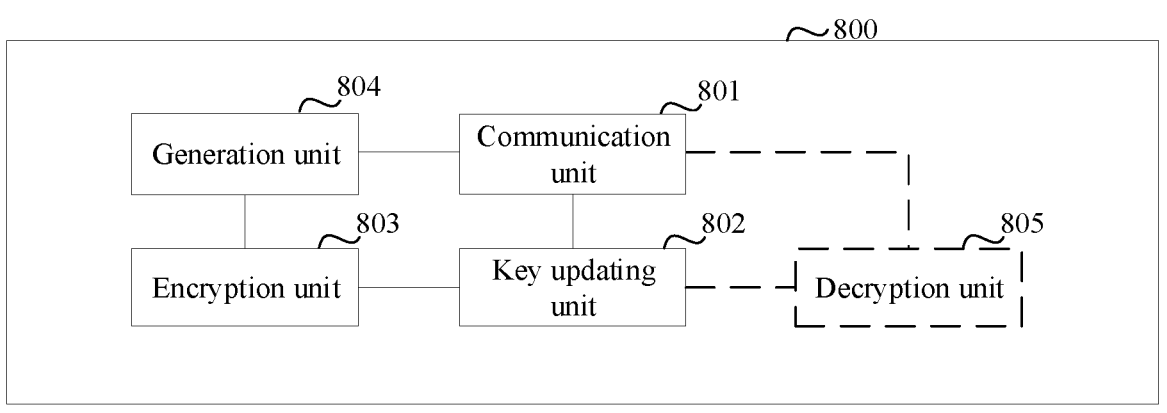
FIG. 8 is a schematic diagram of a structure of a data transmission apparatus according to an embodiment.

Based on the foregoing embodiment and a same concept, FIG. 8 is a schematic diagram of a data transmission apparatus according to an embodiment of this present disclosure. As shown in FIG. 8, the data transmission apparatus 800 may be a first device in a vehicle. The first device may be a first vehicle-mounted device in the vehicle, for example, any ECU in the vehicle, or may be a chip or a circuit, for example, a chip or a circuit that may be disposed in the first vehicle-mounted device.

The data transmission apparatus may correspond to the first vehicle-mounted device in the foregoing method. The data transmission apparatus may implement steps performed by the first vehicle-mounted device in any one or more corresponding methods shown in the FIG. 1 to FIG. 7A and FIG. 7B. The data transmission apparatus 800 may include a communication unit 801, a key updating unit 802, an encryption unit 803, and a generation unit 804. Optionally, the data transmission apparatus 800 may further include a decryption unit 805.

The key updating unit 802 is configured to: when a fresh value corresponding to a message to be sent by the first device is a first fresh value, update an encryption key from a first key to a second key. The encryption unit 803 is configured to: generate a first keystream based on the first fresh value and the second key, and encrypt first data based on the first keystream, to obtain the encrypted first data. The generation unit 804 is configured to generate a first message based on the encrypted first data and the first fresh value. The communication unit 801 is configured to send the first message to a second device.

In a possible implementation, the communication unit 801 is further configured to receive a third message sent by the second device, where the third message includes indication information used to indicate the second device to update the encryption key to the second key; and the key updating unit 802 is further configured to update, based on the third message, a decryption key from a decryption key corresponding to the first key to a decryption key corresponding to the second key.

In a possible implementation, the key updating unit 802 is further configured to delete the first key based on the third message.

In a possible implementation, the third message includes encrypted third data, a fresh value of the third message, and a first identifier, and the indication information is the first identifier.

In a possible implementation, the third message includes encrypted third data and a fresh value of the third message, and the indication information is a fresh value of the third message that meets a specific condition.

In a possible implementation, the specific condition includes: there is a preset value between the fresh value of the third message and a fresh value of a message that is from the second device and that is last received by the first device.

In a possible implementation, after the communication unit 801 sends the first message to the second device, the key updating unit 802 is further configured to: set a switching identifier to a valid state; and update, based on the third message and a fact that the switching identifier is the valid state, the decryption key from the decryption key corresponding to the first key to the decryption key corresponding to the second key; and after the decryption key is updated from the decryption key corresponding to the first key to the decryption key corresponding to the second key, set the switching identifier to an invalid state.

In a possible implementation, after the communication unit 801 sends the first message to the second device, the key updating unit 802 is further configured to: start a timer; and when the timer expires, update the decryption key from the decryption key corresponding to the first key to the decryption key corresponding to the second key.

In a possible implementation, the key updating unit 802 is further configured to: when the timer expires, delete the first key.

In a possible implementation, the apparatus further includes a decryption unit 805; and the decryption unit 805 is configured to: when the timer does not expire, decrypt, by using the decryption key corresponding to the first key, a message sent from the second device to the first device.

In a possible implementation, the decryption unit 805 is further configured to: when the timer does not expire, if the message sent from the second device to the first device cannot be successfully decrypted by using the decryption key corresponding to the first key, decrypt, by using the decryption key corresponding to the second key, the message sent from the second device to the first device.

In a possible implementation, the communication unit 801 is further configured to: receive a fourth message sent by the second device; and send a fifth message to the second device; the key updating unit 802 is further configured to update the encryption key from the second key to a third key based on a fact that the fourth message includes a second fresh value; the encryption unit 803 is further configured to: generate a second keystream based on the third key and a fresh value of the fifth message that is to be sent by the second device and that carries second data; and encrypt the second data based on the second keystream, to obtain the encrypted second data; and the generation unit 804 is further configured to generate the fifth message based on the encrypted second data and the fresh value.

In a possible implementation, the apparatus further includes the decryption unit 805. After the communication unit 801 receives the fourth message sent by the second device, the decryption unit 805 is further configured to successfully decrypt, based on the fact that the fourth message includes the second fresh value, the fourth message by using a decryption key that matches the third key.

When sending information, the communication unit 801 may be a sending unit or a transmitter. When receiving information, the communication unit 801 may be a receiving unit or a receiver. The communication unit 801 may be a transceiver. The transceiver, the transmitter, or the receiver may be a radio frequency circuit. When the data transmission apparatus 800 includes a storage unit, the storage unit is configured to store computer instructions. The key updating unit 802, the encryption unit 803, the generation unit 804, and the decryption unit 805 may be separately communicatively connected to the storage unit, and the key updating unit 802, the encryption unit 803, the generation unit 804, and the decryption unit 805 separately execute the computer instructions stored in the storage unit, so that the data transmission apparatus 800 may be configured to perform the method performed by the first vehicle-mounted device in any one of the foregoing embodiments. The key updating unit 802, the encryption unit 803, the generation unit 804, or the decryption unit 805 may be a general-purpose central processing unit (CPU), a microprocessor, or an application-specific integrated circuit (ASIC).

When the data transmission apparatus 800 is the first vehicle-mounted device, the communication unit 801 may be an input and/or output interface, a pin, a circuit, or the like. The key updating unit 802, the encryption unit 803, the generation unit 804, and the decryption unit 805 may execute computer-executable instructions stored in the storage unit, so that the chip in the data transmission apparatus 800 performs the method performed in any one of embodiments. Optionally, the storage unit is a storage unit in the chip, for example, a register or a cache. The storage unit may be further a storage unit outside the chip in the data transmission apparatus 800, for example, a read-only memory (ROM), another type of static storage device that can store static information and instructions, or a random access memory (RAM).

For concepts, explanations, detailed descriptions, and other steps of the data transmission apparatus 800 that are related to the technical solutions provided in embodiments of this present disclosure, refer to the descriptions of the content in the foregoing methods or other embodiments. Details are not described herein again.

Figure 9:
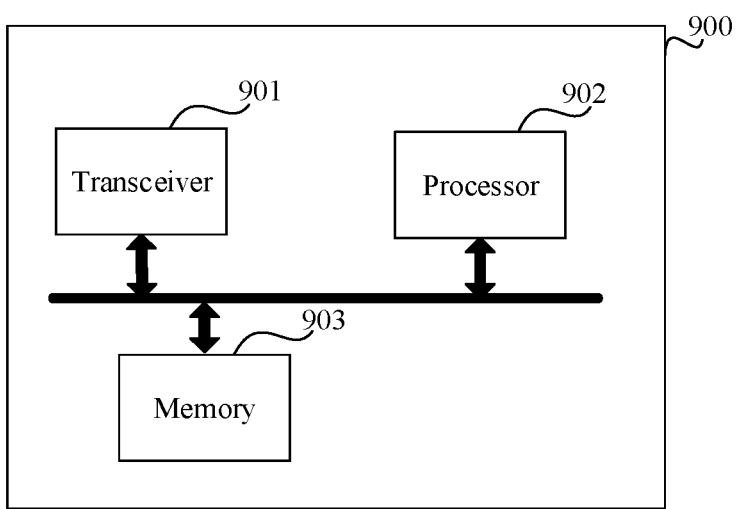
FIG. 9 is a schematic diagram of a structure of a data transmission apparatus according to an embodiment.

According to the foregoing method, FIG. 9 is a schematic diagram of a structure of a data transmission apparatus according to an embodiment of this present disclosure. As shown in FIG. 9, the apparatus may be a first device. The first device may be a first vehicle-mounted device or a vehicle-mounted module in a vehicle, or may be a chip or a circuit in a first vehicle-mounted device.

Further, the data transmission apparatus 900 may further include a bus system. A processor 902, a memory 903, and a transceiver 901 may be connected through the bus system.

It should be understood that, the processor 902 may be a chip. For example, the processor 902 may be a field programmable gate array (FPGA), an application-specific integrated chip (ASIC), a system on a chip (SoC), a central processing unit (CPU), a network processor (NP), a digital signal processor (DSP), a micro controller unit (MCU), a programmable logic device (PLD), or another integrated chip.

During implementation, steps of the foregoing methods may be accomplished by using a hardware integrated logic circuit in the processor 902 or instructions in a form of software. Steps of the methods disclosed with reference to embodiments of this present disclosure may be directly executed and accomplished by using a hardware processor, or may be executed and accomplished by using a combination of hardware and software modules in the processor 902. The software module may be located in a mature storage medium in the art, such as a random access memory, a flash memory, a read-only memory, a programmable read-only memory, an electrically erasable programmable memory, or a register. The storage medium is located in the memory 903, and the processor 902 reads information in the memory 903 and accomplishes the steps in the foregoing methods in combination with the hardware of the processor 902.

It should be noted that, the processor 902 in this embodiment of this present disclosure may be an integrated circuit chip, and has a signal processing capability. During implementation, the steps of the foregoing method embodiments can be accomplished by using a hardware integrated logic circuit in the processor or instructions in a form of software. The processor may be a general-purpose processor, a digital signal processor (DSP), an application-specific integrated circuit (ASIC), a field programmable gate array (FPGA) or another programmable logic device, a discrete gate or a transistor logic device, or a discrete hardware component. The processor may implement or perform the methods, steps, and logical block diagrams that are disclosed in embodiments of this present disclosure. The general-purpose processor may be a microprocessor, or the processor may be any conventional processor or the like. Steps of the methods disclosed with reference to embodiments of this present disclosure may be directly executed and accomplished by a hardware decoding processor, or may be executed and accomplished by using a combination of hardware and software modules in a decoding processor. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and accomplishes the steps in the foregoing methods in combination with hardware of the processor.

It may be understood that the memory 903 in this embodiment of this present disclosure may be a volatile memory or a nonvolatile memory, or may include a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. By way of example but not limitative description, a plurality forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus dynamic random access memory (DR RAM). It should be noted that the memory of the system and methods described in this specification includes but is not limited to these memories and any memory of another proper type.

When the data transmission apparatus 900 corresponds to the first vehicle-mounted device in the foregoing method, the data transmission apparatus may include the processor 902, the transceiver 901, and the memory 903. The memory 903 is configured to store instructions. The processor 902 is configured to execute the instructions stored in the memory 903, to implement the related solution of the first vehicle-mounted device in one or more corresponding methods shown in FIG. 1 to FIG. 7A and FIG. 7B.

When the data transmission apparatus 900 is the foregoing first vehicle-mounted device, the data transmission apparatus 900 may be configured to perform the method performed by the first vehicle-mounted device in any one of the foregoing embodiments.

The processor 902 may update, when a fresh value corresponding to a message to be sent by the first device is a first fresh value, an encryption key from a first key to a second key, and generate a first keystream based on the first fresh value and the second key; encrypt first data based on the first keystream, to obtain the encrypted first data; and generate a first message based on the encrypted first data and the first fresh value. The transceiver 901 may send the first message to the second device.

For concepts, explanations, detailed descriptions, and other steps of the data transmission apparatus 900 that are related to the technical solutions of the first-mounted device provided in embodiments of this present disclosure, refer to the descriptions of the content in the foregoing methods or other embodiments. Details are not described herein again.

Figure 10:
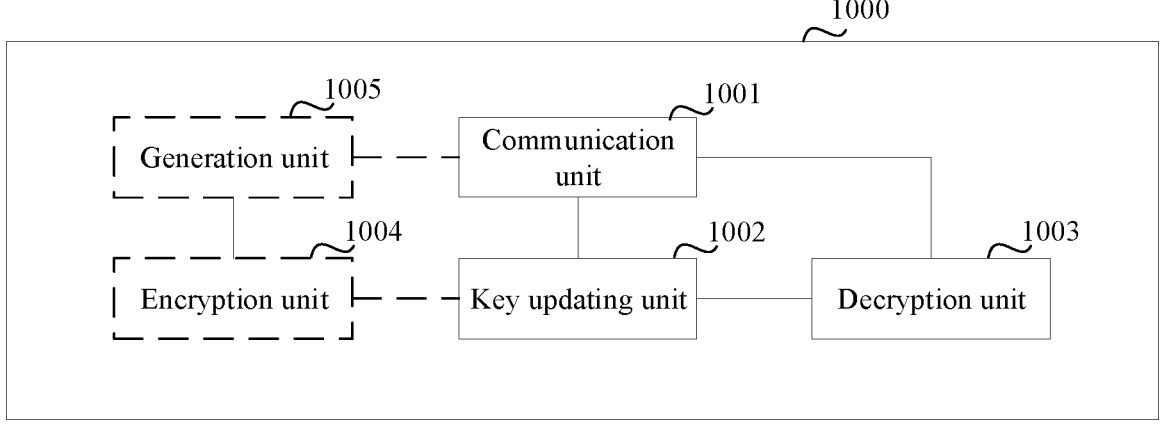
FIG. 10 is a schematic diagram of a structure of a data transmission apparatus according to an embodiment.

Based on the foregoing embodiment and a same concept, FIG. 10 is a schematic diagram of a data transmission apparatus according to an embodiment of this present disclosure. As shown in FIG. 10, the data transmission apparatus 1000 may be a second device in a vehicle. The second device may be a second vehicle-mounted device in the vehicle, for example, any ECU in the vehicle, or may be a chip or a circuit, for example, a chip or a circuit that may be disposed in the second vehicle-mounted device.

The data transmission apparatus may correspond to the second vehicle-mounted device in the foregoing method. The data transmission apparatus may implement steps performed by the second vehicle-mounted device in any one or more corresponding methods shown in the FIG. 1 to FIG. 7A and FIG. 7B. The data transmission apparatus 1000 may include a communication unit 1001, a key updating unit 1002, and a decryption unit 1003. Optionally, the data transmission apparatus 1000 may further include an encryption unit 1004 and a generation unit 1005.

The communication unit 1001 is configured to receive a first message from a first device, where the first message includes encrypted first data and a fresh value of the first message; the key updating unit 1002 is configured to update, based on a fact that the fresh value of the first message is a first fresh value, a decryption key from a decryption key corresponding to a first key to a decryption key corresponding to a second key; and the encryption unit 1004 is configured to decrypt the first message based on the first fresh value and the decryption key corresponding to the second key, to obtain the first data.

In a possible implementation, the key updating unit 1002 is further configured to update an encryption key from the first key to the second key based on the fact that the fresh value of the first message is the first fresh value; and the communication unit 1001 is further configured to send a third message to the first device, where the third message includes third data encrypted by using the second key. The encrypted third data may be generated by the encryption unit 1004 by encrypting the third data based on the second key, and the third data may be generated by the generation unit 1005 based on the encrypted third data, a fresh value of the third message, and the like.

In a possible implementation, the third message further includes indication information used to indicate the second device to update the encryption key to the second key.

In a possible implementation, the third message further includes a first identifier, and the indication information is the first identifier.

In a possible implementation, the third message further includes the fresh value of the third message, and the indication information is a fresh value of the third message that meets a specific condition.

In a possible implementation, the specific condition includes: there is a preset value between the fresh value of the third message and a fresh value of a message that is last sent by the second device to the first device.

When sending information, the communication unit 1001 may be a sending unit or a transmitter. When receiving information, the communication unit 1001 may be a receiving unit or a receiver. The communication unit 1001 may be a transceiver. The transceiver, the transmitter, or the receiver may be a radio frequency circuit. When the data transmission apparatus 1000 includes a storage unit, the storage unit is configured to store computer instructions. The key updating unit 1002, the decryption unit 1003, the generation unit 1005, and the encryption unit 1004 may be communicatively connected to the storage unit, and the key updating unit 1002, the decryption unit 1003, the generation unit 1005, and the encryption unit 1004 separately execute the computer instructions stored in the storage unit, so that the data transmission apparatus 1000 may be configured to perform the method performed by the first vehicle-mounted device in any one of the foregoing embodiments. The key updating unit 1002, the decryption unit 1003, the generation unit 1005, or the encryption unit 1004 may be a general-purpose central processing unit (CPU), a microprocessor, or an application-specific integrated circuit (ASIC).

When the data transmission apparatus 1000 is the first vehicle-mounted device, the communication unit 1001 may be an input and/or output interface, a pin, a circuit, or the like. The key updating unit 1002, the decryption unit 1003, the generation unit 1005, and the encryption unit 1004 may execute computer-executable instructions stored in the storage unit, so that the chip in the data transmission apparatus 1000 performs the method performed in any one of embodiments. Optionally, the storage unit is a storage unit in the chip, for example, a register or a cache. The storage unit may be further a storage unit outside the chip in the data transmission apparatus 1000, for example, a read-only memory (ROM), another type of static storage device that can store static information and instructions, or a random access memory (RAM).

For concepts, explanations, detailed descriptions, and other steps of the data transmission apparatus 1000 that are related to the technical solutions provided in embodiments of this present disclosure, refer to the descriptions of the content in the foregoing methods or other embodiments. Details are not described herein again.

Figure 11:
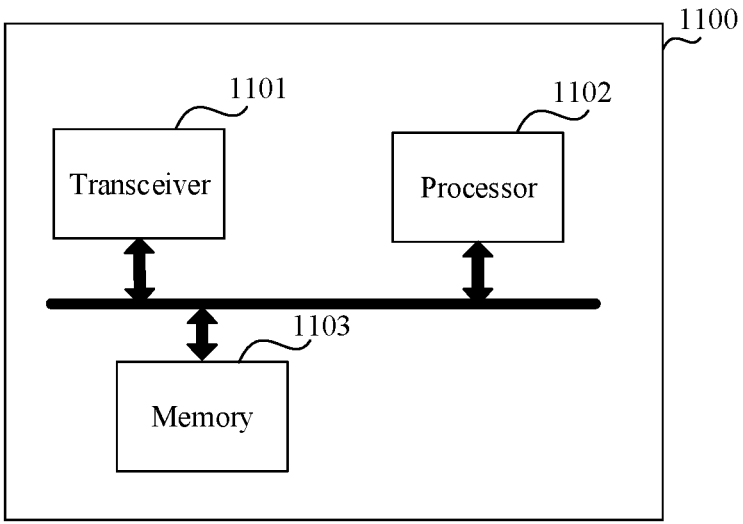
FIG. 11 is a schematic diagram of a structure of a data transmission apparatus according to an embodiment.

According to the foregoing method, FIG. 11 is a schematic diagram of a structure of a data transmission apparatus according to an embodiment of this present disclosure. As shown in FIG. 11, the apparatus may be a second device. The second device may be a second vehicle-mounted device or a vehicle-mounted module in a vehicle, or may be a chip or a circuit in a second vehicle-mounted device.

Further, the data transmission apparatus 1100 may further include a bus system. A processor 1102, a memory 1103, and a transceiver 1101 may be connected through the bus system.

It should be understood that, the processor 1102 may be a chip. For example, the processor 1102 may be a field programmable gate array (FPGA), an application-specific integrated chip (ASIC), a system on a chip (SoC), a central processing unit (CPU), a network processor (NP), a digital signal processor (DSP), a micro controller unit (MCU), a programmable logic device (PLD), or another integrated chip.

During implementation, steps of the foregoing methods may be accomplished by using a hardware integrated logic circuit in the processor 1102 or instructions in a form of software. Steps of the methods disclosed with reference to embodiments of this present disclosure may be directly executed and accomplished by using a hardware processor, or may be executed and accomplished by using a combination of hardware and software modules in the processor 1102. The software module may be located in a mature storage medium in the art, such as a random access memory, a flash memory, a read-only memory, a programmable read-only memory, an electrically erasable programmable memory, or a register. The storage medium is located in the memory 1103, and the processor 1102 reads information from the memory 1103 and accomplishes the steps in the foregoing methods in combination with the hardware of the processor 1102.

It should be noted that, the processor 1102 in this embodiment of this present disclosure may be an integrated circuit chip, and has a signal processing capability. During implementation, the steps of the foregoing method embodiments can be accomplished by using a hardware integrated logic circuit in the processor or instructions in a form of software. The processor may be a general-purpose processor, a digital signal processor (DSP), an application-specific integrated circuit (ASIC), a field programmable gate array (FPGA) or another programmable logic device, a discrete gate or a transistor logic device, or a discrete hardware component. The processor may implement or perform the methods, steps, and logical block diagrams that are disclosed in embodiments of this present disclosure. The general-purpose processor may be a microprocessor, or the processor may be any conventional processor or the like. Steps of the methods disclosed with reference to embodiments of this present disclosure may be directly executed and accomplished by a hardware decoding processor, or may be executed and accomplished by using a combination of hardware and software modules in the decoding processor. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and accomplishes the steps in the foregoing methods in combination with hardware of the processor.

It may be understood that the memory 1103 in this embodiment of this present disclosure may be a volatile memory or a nonvolatile memory, or may include a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. By way of example but not limitative description, a plurality forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus dynamic random access memory (DR RAM). It should be noted that the memory of the system and methods described in this specification includes but is not limited to these memories and any memory of another proper type.

When the data transmission apparatus 1100 corresponds to the second vehicle-mounted device in the foregoing method, the data transmission apparatus may include the processor 1102, the transceiver 1101, and the memory 1103. The memory 1103 is configured to store instructions. The processor 1102 is configured to execute the instructions stored in the memory 1103, to implement the related solution of the second vehicle-mounted device in one or more corresponding methods shown in FIG. 1 to FIG. 7A and FIG. 7B.

When the data transmission apparatus 1100 is the second vehicle-mounted device, the data transmission apparatus 1100 may be configured to perform the method performed by the second vehicle-mounted device in any one of the foregoing embodiments.

When the data transmission apparatus 1100 is the second vehicle-mounted device, the transceiver 1101 may receive a first message from a first device, where the first message includes encrypted first data and a fresh value of the first message; and the processor 1102 may update, based on a fact that a fresh value of the first message is a first fresh value, a decryption key from a decryption key corresponding to a first key to a decryption key corresponding to a second key; and decrypt the first message based on the first fresh value and the decryption key corresponding to the second key, to obtain the first data.

For concepts, explanations, detailed descriptions, and other steps of the data transmission apparatus 1100 that are related to the technical solutions of the second vehicle-mounted device provided in embodiments of this present disclosure, refer to descriptions of the content in the foregoing methods or other embodiments. Details are not described herein again.

It should be understood that division into units of the data transmission apparatus 800 and the data transmission apparatus 1000 is merely logical function division. During actual implementation, all or some of the units may be integrated into one physical entity, or may be physically separated. In this embodiment of this present disclosure, the communication unit 801, the key updating unit 802, the encryption unit 803, the generation unit 804, and the decryption unit 805 may be implemented by the transceiver 901 in FIG. 9, and the key updating unit 1002, the decryption unit 1003, the generation unit 1005, and the encryption unit 1004 may be implemented by the processor 1102 in FIG. 11.

According to the method provided in embodiments of this present disclosure, a computer program product is provided. The computer program product includes computer program code, and when the computer program code is run on a computer, the computer is enabled to perform the method according to any one of embodiments shown in FIG. 1 to FIG. 7A and FIG. 7B.

According to the method provided in embodiments of this present disclosure, a computer-readable storage medium is further provided. The computer-readable storage medium stores program code, and when the program code is run on a computer, the computer is enabled to perform the method according to any one of embodiments shown in FIG. 1 to FIG. 7A and FIG. 7B.

According to the method provided in embodiments of this present disclosure, a data transmission system is further provided, including at least two of a first vehicle-mounted device and one or more second vehicle-mounted devices.

An embodiment of this present disclosure further provides a vehicle, including at least one of the first vehicle-mounted device and the second vehicle-mounted device that are mentioned in the foregoing embodiments of this present disclosure.

Terms such as "component", "module", and "system" used in this specification indicate computer-related entities, hardware, firmware, combinations of hardware and software, software, or software being executed. For example, a component may be, but is not limited to, a process that runs on a processor, a processor, an object, an executable file, a thread of execution, a program, and/or a computer. As illustrated by using figures, both a computing device and an application that runs on the computing device may be components. One or more components may reside within a process and/or a thread of execution, and a component may be located on one computer and/or distributed between two or more computers. In addition, these components may be executed by various computer-readable media that store various data structures. For example, the components may communicate by using a local and/or remote process and based on a signal having one or more data packets (for example, data from two components interacting with another component in a local system, a distributed system, and/or across a network such as an internet interacting with another system by using the signal).

A person of ordinary skill in the art may be aware that, in combination with illustrative logical blocks described in embodiments disclosed in this specification and steps, this application may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this present disclosure.

A person skilled in the art may clearly understand that, for the purpose of convenient and brief description, for a detailed working process of the foregoing system, apparatus, and unit, refer to a corresponding process in the foregoing method embodiments. Details are not described herein again.

In the several embodiments provided in this present disclosure, it should be understood that the disclosed system, apparatus, and method may be implemented in other manners. For example, the described apparatus embodiment is only an example. For example, division of the units is only logical function division, and may be other division during actual implementation. For example, a plurality of units or components may be combined or may be integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, and may be located in one position, or may be distributed on a plurality of network units. Some or all of the units may be selected based on actual requirements to achieve the objectives of the solutions in embodiments.

In addition, functional units in embodiments of this present disclosure may be integrated into one processing unit, each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of this present disclosure essentially, or the part contributing to the conventional technology, or some of the technical solutions may be implemented in a form of a software product. The computer software product is stored in a storage medium, and includes several instructions for instructing a computer device (which may be a personal computer, a server, or a network device) to perform all or some of the steps of the methods described in embodiments of this present disclosure. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of this present disclosure, but the protection scope of this present disclosure is not limited thereto. Any variation or replacement readily figured out by a person skilled in the art within the technical scope disclosed in this present disclosure shall fall within the protection scope of this present disclosure. Therefore, the protection scope of this present disclosure shall be subject to the protection scope of the claims.

What is claimed is:

1. A data transmission apparatus applied to a first device, comprising at least one processor and at least one memory, wherein the at least one memory stores program instructions, and the at least one processor is coupled to the at least one memory to execute the instructions to:

update an encryption key from a first key to a second key, and generate a first keystream based on a first fresh value and the second key, based on a fresh value corresponding to a message to be sent by the first device being the first fresh value;

encrypt first data based on the first keystream, to obtain the encrypted first data;

generate a first message based on the encrypted first data and the first fresh value;

send the first message to a second device;

receive a third message sent by the second device, wherein the third message comprises indication information indicating that the second device updated the encryption key to the second key; and update, based on the third message, a decryption key from a decryption key corresponding to the first key to a decryption key corresponding to the second key.

2. The apparatus according to claim 1, wherein the at least one processor coupled to the at least one memory further executes the instructions to:

delete the first key based on the third message.

3. The apparatus according to claim 1, wherein the third message comprises encrypted third data, a fresh value of the third message, and a first identifier, and wherein the indication information is the first identifier.

4. The apparatus according to claim 1, wherein the third message comprises encrypted third data and a fresh value of the third message, and the indication information is the fresh value of the third message that meets a specific condition.

5. The apparatus according to claim 4, wherein the specific condition comprises:

there is a preset value between the fresh value of the third message and a fresh value of a message that is last received by the first device from the second device.

6. The apparatus according to claim 1, wherein the third message comprises third data encrypted according to the second key and a freshness value of the third message, and that the third data is encrypted according to the second key indicates the second device updated the encryption key to the second key.

7. The apparatus according to claim 1, wherein the at least one processor coupled to the at least one memory further executes the instructions to:

set a switching identifier to a valid state;

update, based on the third message and a fact that the switching identifier is the valid state, the decryption key from the decryption key corresponding to the first key to the decryption key corresponding to the second key; and set the switching identifier to an invalid state.

8. The apparatus according to claim 1, wherein the at least one processor coupled to the at least one memory further executes the instructions to:

start a timer; and update a decryption key from a decryption key corresponding to the first key to a decryption key corresponding to the second key in response to an expiration of the timer.

9. The apparatus according to claim 8, wherein the at least one processor coupled to the at least one memory further executes the instructions to:

delete the first key in response to the expiration of the timer.

10. The apparatus according to claim 8, wherein the at least one processor coupled to the at least one memory further executes the instructions to:

decrypt, by using the decryption key corresponding to the first key, a message sent from the second device to the first device, in response to the timer having not expired.

11. The apparatus according to claim 10, wherein the at least one processor coupled to the at least one memory further executes the instructions to:

decrypt, by using the decryption key corresponding to the second key, the message sent from the second device to the first device, in response to the timer having not expired, based on the message sent from the second device to the first device not being successfully decrypted by using the decryption key corresponding to the first key.

12. The apparatus according to claim 1, wherein the at least one processor coupled to the at least one memory further executes the instructions to:

receive a fourth message sent by the second device;

update the encryption key from the second key to a third key based on the fourth message comprising a second fresh value;

generate a second keystream based on the third key and a fresh value of a fifth message that is to be sent by the second device and that carries second data;

encrypt the second data based on the second keystream, to obtain the encrypted second data;

generate the fifth message based on the encrypted second data and the fresh value of the fifth message; and send the fifth message to the second device.

13. The apparatus according to claim 12, wherein the at least one processor coupled to the at least one memory further executes the instructions to:

decrypt, based on the fourth message comprising the second fresh value, the fourth message by using a decryption key that matches the third key.

14. A data transmission apparatus applied to a second device, comprising at least one processor and at least one memory, wherein the at least one memory stores program instructions, and the at least one processor is coupled to the at least one memory to execute the instructions to:

receive a first message from a first device, wherein the first message comprises encrypted first data and a fresh value of the first message;

update, based on the fresh value of the first message being a first fresh value, a decryption key from a decryption key corresponding to a first key to a decryption key corresponding to a second key;

decrypt the first message based on the first fresh value and the decryption key corresponding to the second key, to obtain the first data;

update an encryption key from the first key to the second key based on the fresh value of the first message being the first fresh value; and send a third message to the first device, wherein the third message comprises third data encrypted by using the second key.

15. The apparatus according to claim 14, wherein the third message further comprises indication information indicating that the second device updated the encryption key to the second key.

16. The apparatus according to claim 15, wherein the third message further comprises a first identifier, and the indication information is the first identifier.

17. The apparatus according to claim 15, wherein the third message further comprises a fresh value of the third message, and the indication information is the fresh value of the third message that meets a specific condition.

18. The apparatus according to claim 17, wherein the specific condition comprises:

there is a preset value between the fresh value of the third message and a fresh value of a message that is last sent from the second device to the first device.

19. The apparatus according to claim 14, wherein the third message further comprises a freshness value of the third message, and that the third data is encrypted by using the second key indicates the second device updated the encryption key to the second key.

20. The apparatus according to claim 14, wherein the at least one processor coupled to the at least one memory further executes the instructions to:

based on the third message, delete the first key.

* * * * *